United States Patent
Nishiyama et al.

(10) Patent No.: US 9,055,218 B2
(45) Date of Patent: Jun. 9, 2015

(54) IMAGE PROCESSING APPARATUS, IMAGE PROCESSING METHOD, AND PROGRAM FOR COMBINING THE MULTI-VIEWPOINT IMAGE DATA

(75) Inventors: Tomohiro Nishiyama, Kawasaki (JP); Yuichi Nakada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 13/599,293

(22) Filed: Aug. 30, 2012

(65) Prior Publication Data
US 2013/0058591 A1 Mar. 7, 2013

(30) Foreign Application Priority Data

Sep. 1, 2011 (JP) .................... 2011-190863
Jun. 20, 2012 (JP) .................... 2012-138922

(51) Int. Cl.
G06K 9/40 (2006.01)
H04N 5/232 (2006.01)
H04N 5/217 (2011.01)
G06T 5/50 (2006.01)
G06T 3/40 (2006.01)

(52) U.S. Cl.
CPC .......... *H04N 5/23229* (2013.01); *H04N 5/217* (2013.01); *G06T 5/50* (2013.01); *G06T 2200/21* (2013.01); *G06T 2207/20221* (2013.01); *G06T 3/4038* (2013.01)

(58) Field of Classification Search
None
See application file for complete search history.

(56) References Cited

U.S. PATENT DOCUMENTS

| | | | |
|---|---|---|---|
| 2002/0061131 A1* | 5/2002 | Sawhney et al. | 382/154 |
| 2009/0296984 A1* | 12/2009 | Nijim et al. | 382/103 |
| 2010/0026712 A1* | 2/2010 | Aliprandi et al. | 345/629 |
| 2010/0103175 A1 | 4/2010 | Okutomi et al. | |
| 2010/0177979 A1* | 7/2010 | Kotani | 382/255 |
| 2012/0147205 A1* | 6/2012 | Lelescu et al. | 348/218.1 |
| 2012/0155784 A1 | 6/2012 | Nishiyama | |
| 2012/0281072 A1* | 11/2012 | Georgiev et al. | 348/49 |
| 2012/0287329 A1* | 11/2012 | Yahata | 348/345 |
| 2012/0314104 A1 | 12/2012 | Nishiyama | |
| 2013/0009952 A1* | 1/2013 | Tam et al. | 345/419 |
| 2013/0077882 A1* | 3/2013 | Venkataraman et al. | 382/233 |
| 2013/0088489 A1* | 4/2013 | Schmeitz et al. | 345/419 |
| 2013/0128069 A1* | 5/2013 | Georgiev et al. | 348/222.1 |
| 2013/0222633 A1* | 8/2013 | Knight et al. | 348/222.1 |
| 2013/0258139 A1* | 10/2013 | Omori | 348/239 |

FOREIGN PATENT DOCUMENTS

JP 2009-211254 A 9/2009
WO 2008/050904 A1 5/2008

OTHER PUBLICATIONS

R. Ng, et al., "Light Field Photography with a Hand-held Plenoptic Camera", Stanford Tech Report, CTSR Feb. 2005, pp. 1-11.

* cited by examiner

*Primary Examiner* — Li Liu
(74) *Attorney, Agent, or Firm* — Fitzpatrick, Cella, Harper & Scinto

(57) ABSTRACT

An image processing apparatus that generates composite image data using multi-viewpoint image data obtained by capturing images from a plurality of viewpoints may include a filter processing unit configured to perform filter processing on the multi-viewpoint image data based on distance information indicative of a distance to a subject and a generation unit configured to generate composite image data by combining the multi-viewpoint image data on which the filter processing has been performed.

16 Claims, 25 Drawing Sheets

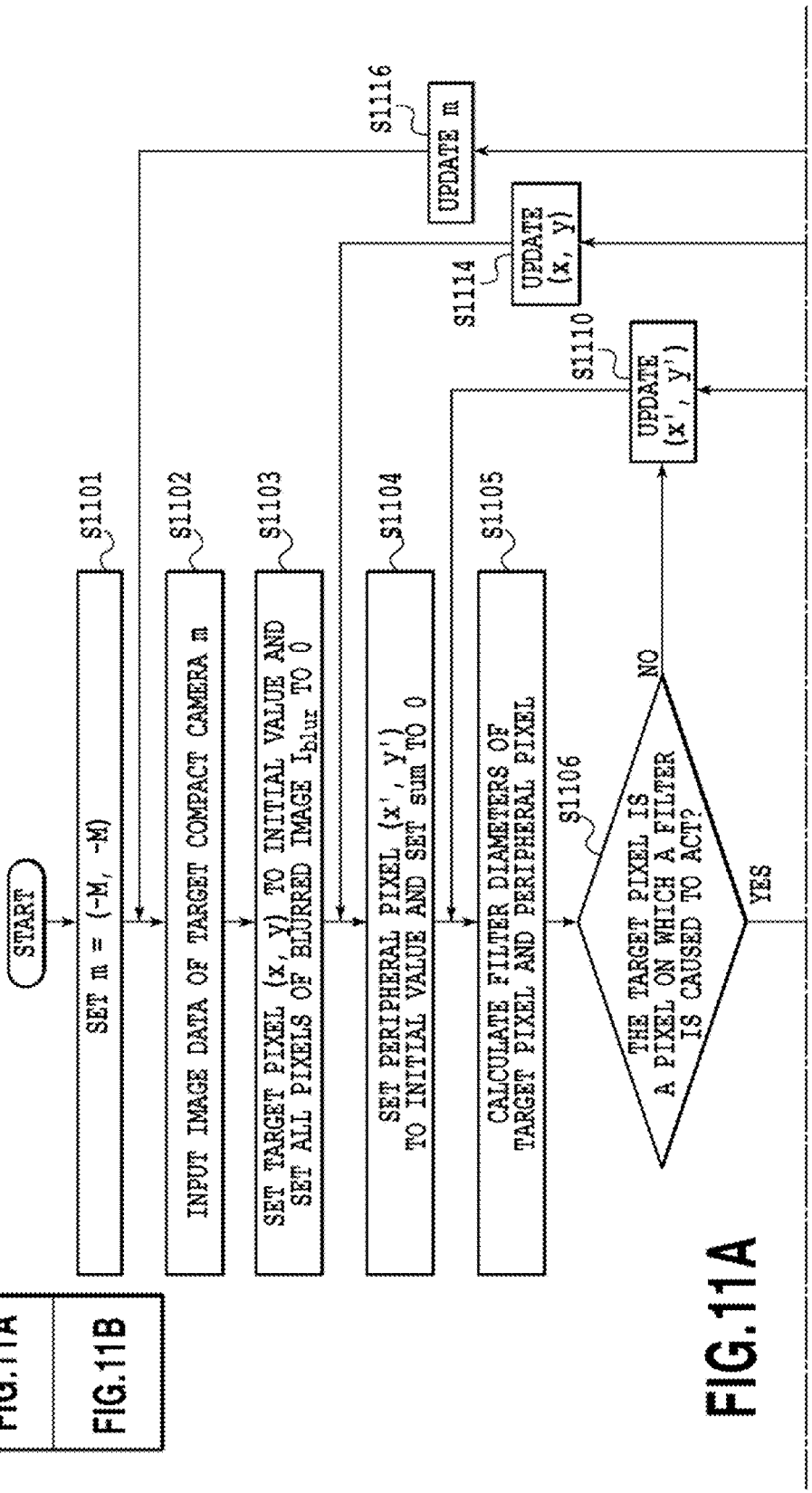

| 0.024 | 0.035 | 0.039 | 0.035 | 0.024 |
|---|---|---|---|---|
| 0.035 | 0.048 | 0.054 | 0.048 | 0.035 |
| 0.039 | 0.054 | 0.06 | 0.054 | 0.039 |
| 0.035 | 0.048 | 0.054 | 0.048 | 0.035 |
| 0.024 | 0.035 | 0.039 | 0.035 | 0.024 |

FIG.19A

| 0 | 0 | 0.024 | 0.035 | 0.039 | 0.035 | 0.024 |
|---|---|---|---|---|---|---|
| 0 | 0 | 0.035 | 0.048 | 0.054 | 0.048 | 0.035 |
| 0 | 0 | 0.039 | 0.054 | 0.06 | 0.054 | 0.039 |
| 0 | 0 | 0.035 | 0.048 | 0.054 | 0.048 | 0.035 |
| 0 | 0 | 0.024 | 0.035 | 0.039 | 0.035 | 0.024 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

FIG.19B

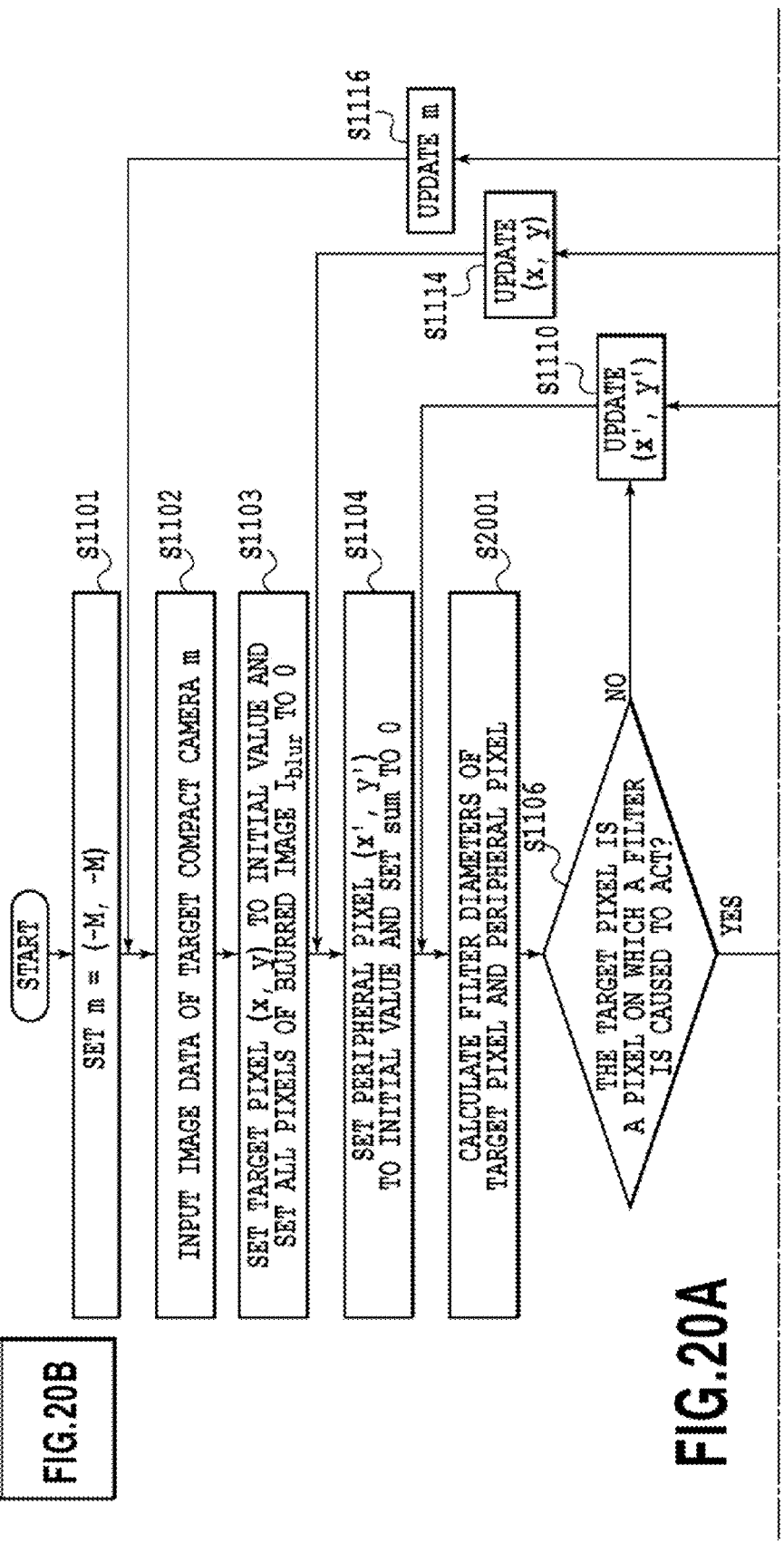

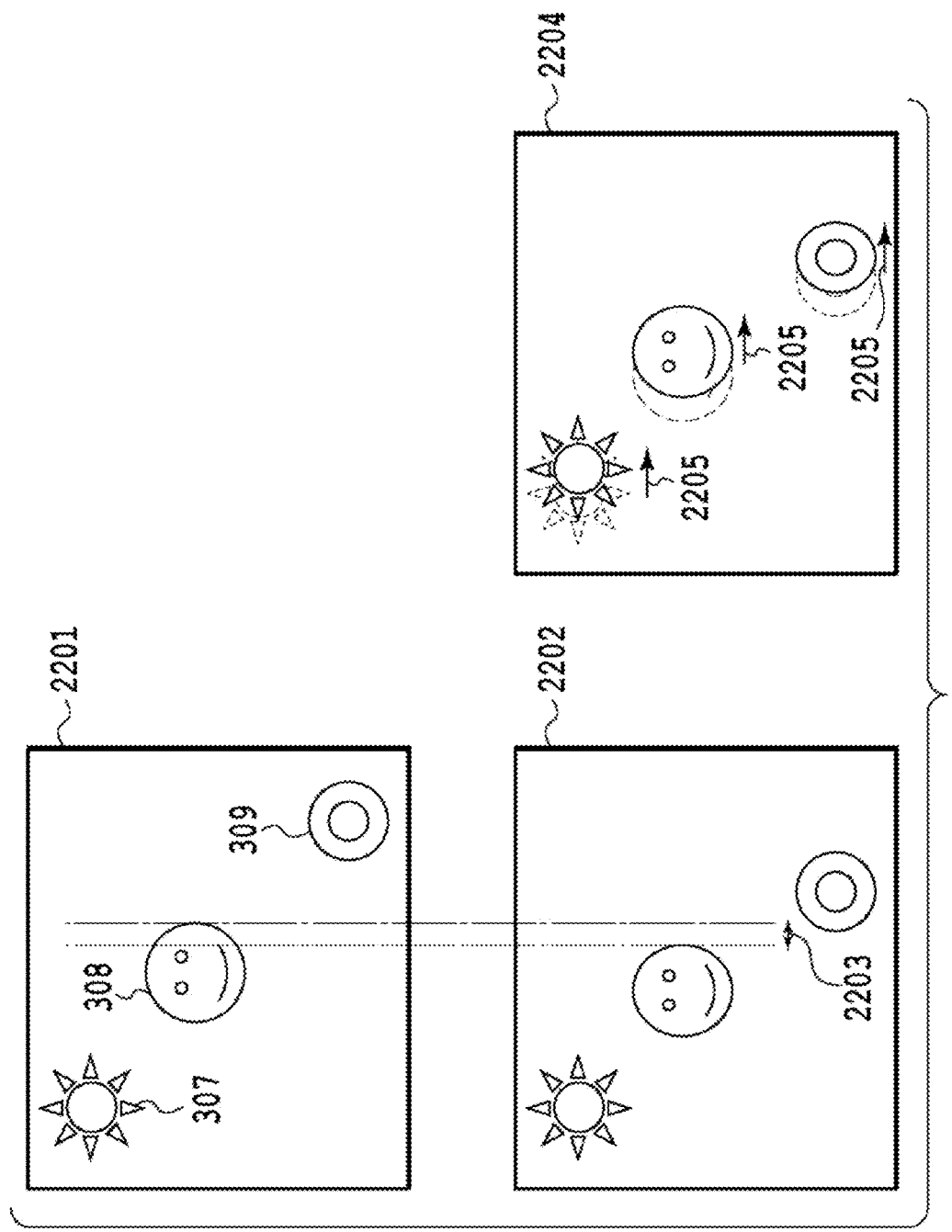

IMAGE PROCESSING APPARATUS, IMAGE PROCESSING METHOD, AND PROGRAM FOR COMBINING THE MULTI-VIEWPOINT IMAGE DATA

BACKGROUND OF THE INVENTION

1. Field of the Invention

The present invention relates to composite processing of an image using multi-viewpoint image data.

2. Description of the Related Art

Conventionally, when an image was captured by erroneous focus adjustment of a camera, it was necessary to recapture the image after performing focus adjustment again. Further, when it was desired to obtain focused images of a plurality of subjects the depths of which are different from each other, it was necessary to capture the image of each subject in focus a plurality of times.

In recent years, a technique called light field photography has been developed, that is capable of acquiring images from multiple viewpoints by adding a new optical element to the optical system and of adjusting the focus position by the later image processing (refocus).

By using this technique, there is an advantage that a failure in focus adjustment at the time of image capturing can be recovered by image processing because focus adjustment can be performed after image capturing. Further, there is also an advantage that it is possible to acquire a plurality of images focused on arbitrary subjects in an image from one captured image by changing the image processing method, and therefore, it is possible to reduce the number of times of image capturing.

In light field photography, the direction and intensity of a light beam that passes through each position (light field, hereinafter, referred to as "LF") in a plurality of positions in the space are calculated from multi-viewpoint image data. Then, by using the information of the obtained LF, an image on the assumption that light passes through a virtual optical system and forms the image on a virtual sensor is calculated. By appropriately setting such a virtual optical system and a virtual sensor, refocus is also enabled. The mathematical nature and the mathematical foundation of LF have been discussed by R. NG etc. (R. NG, M. Levoy, M. Bredif, G. Duval, M. Horowitz, P. Hanrahan, "Light Field Photography with a Hand-held Plenoptic Camera" (Stanford Tech Report CTSR 2005-02, 2005). Hereinafter, processing to calculate image data obtained by a virtual sensor from multi-viewpoint image data is called composite processing.

As an image capturing technique for acquiring LF, a Plenoptic camera in which a microlens array is placed behind a main lens and a camera array in which compact cameras are arrayed are known. It is possible for both the techniques to combine image data on a virtual sensor after image capturing from the acquired LF. At this time, by changing the range of LF to be combined, it is made possible to adjust also the depth of field after image capturing.

As a method for combining images on a virtual sensor from LF, there is known a method in which acquired multi-viewpoint image data is subjected to projective transformation onto a virtual sensor, added and averaged (WO2008/050904).

However, the technique of WO2008/050904 has such a problem that an artifact occurs in a blur of a subject out of focus, and therefore, the blur is not smooth. As a method for solving the problem, there is known a method for reproducing a smooth blur by estimating the shape of a subject from multi-viewpoint image data and generating an image by performing tracing of a light beam having passed through a lens based on the information (Japanese Patent Laid-Open No. 2009-211254).

However, by the method of Japanese Patent Laid-Open No. 2009-211254, the light beam tracing is performed, and therefore, the burden of the processing is very heavy. Further, when the shape is estimated erroneously, the deterioration in image quality will be caused.

SUMMARY OF THE INVENTION

An image processing apparatus according to the present invention is an image processing apparatus that generates composite image data using multi-viewpoint image data obtained by capturing images from a plurality of viewpoints and characterized by including a filter processing unit configured to perform filter processing on the multi-viewpoint image data based on distance information indicative of a distance to a subject and a generation unit configured to generate composite image data by combining the multi-viewpoint image data having been subjected to the filter processing.

According to the present invention, in the processing to combine images on a virtual sensor from LF, it is possible to make smooth a blur of a subject at a position other than the focus position by processing with a less amount of calculation and robust to a shape estimation error.

Further features of the present invention will become apparent from the following description of exemplary embodiments (with reference to the attached drawings).

BRIEF DESCRIPTION OF THE DRAWINGS

FIG. 11 is a diagram showing the relationship between FIGS. 11A and 11B. FIGS. 11A and 11B are flowcharts showing a flow of processing in the filtering unit;

FIGS. 19A and 19B are conceptual diagrams when a filter is caused to deviate and act;

FIG. 20 is a diagram showing the relationship between FIGS. 20A and 20B. FIGS. 20A and 20B are flowcharts showing a flow of processing in the filtering unit;

FIG. 22 is a diagram showing the way the whole image is shifted; and

DESCRIPTION OF THE EMBODIMENTS

First Embodiment

Figure 1:
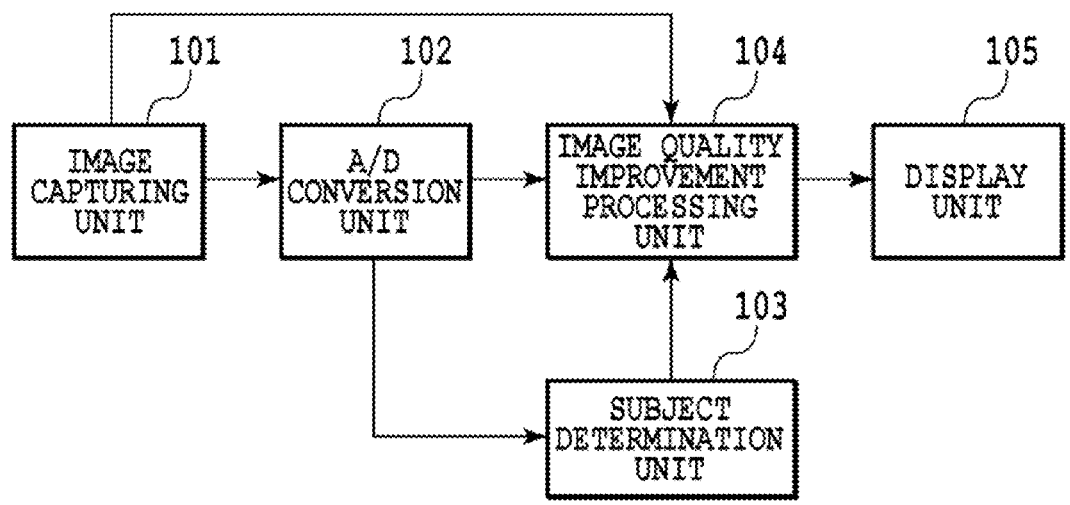
FIG. 1 is a diagram showing principal components of an image capturing device according to a first embodiment.

FIG. 1 is a diagram showing principal components of an image capturing device according to the present embodiment.

An image capturing unit 101 includes a zoom lens, a focus lens, a shake correction lens, a diaphragm, a shutter, an optical low-pass filter, an IR cut filter, a color filter, and image capturing elements, such as CMOS and CCD and detects the quantity of light of a subject. In the present embodiment, it is premised that the image capturing unit 101 is a camera array capable of capturing a plurality of images from different viewpoints at the same time using a plurality of compact cameras.

An A/D conversion unit 102 converts the quantity of light of a subject into a digital value.

A subject determination unit 103 determines a subject to be focused on based on an instruction from a user.

An image quality improvement processing unit 104 performs composite processing of image data etc. based on the information of the determined subject and information input from the A/D conversion unit 102 and the image capturing unit 101 and outputs the generated composite image data to a display unit 105. It may also be possible to configure the image quality improvement processing unit 104 as an independent image processing apparatus.

The display unit 105 displays composite image data.

Although not shown schematically in FIG. 1, the image capturing device includes a CPU configured to integrally control each unit described above, a ROM configured to store control programs etc. executed by the CPU, and a RAM configured to function as a work area etc. of the CPU. Further, the image capturing device also includes an image capturing system control unit configured to control the image capturing system based on an instruction from the CPU and an input unit (user interface) for a user to issue various kinds of instruction.

Next, details of the image quality improvement processing unit 104 are explained.

Figure 2:
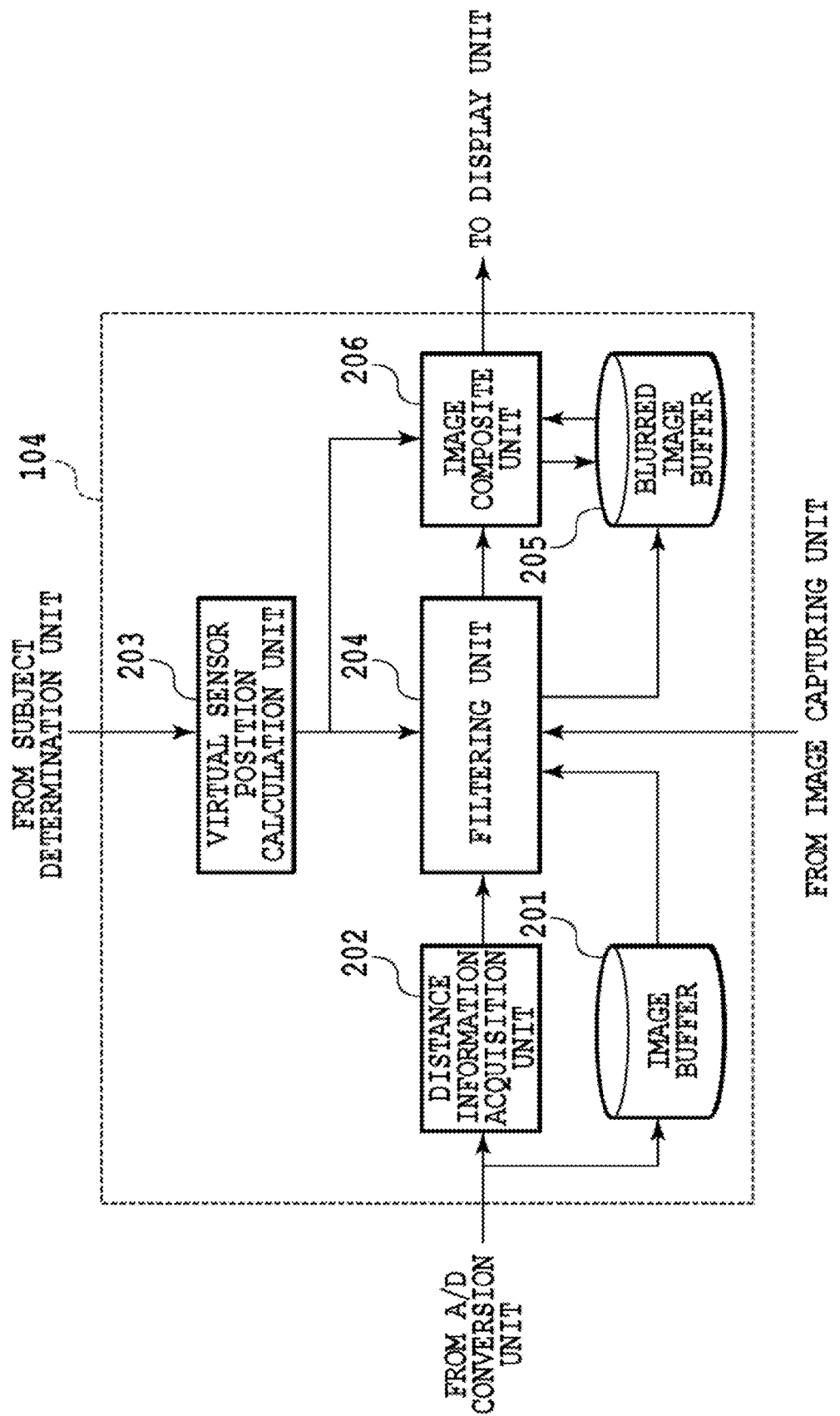
FIG. 2 is a diagram showing an example of an internal configuration of an image quality improvement processing unit.

FIG. 2 is a diagram showing an example of an internal configuration of the image quality improvement processing unit 104.

The image quality improvement processing unit 104 includes an image buffer 201, a distance information acquisition unit 202, a virtual sensor position calculation unit 203, a filtering unit 204, a blurred image buffer 205, and an image composite unit 206. In the following, each unit is explained.

The image buffer 201 temporarily stores data of a plurality of images with a parallax attached (hereinafter, referred to as "multi-viewpoint image data") received from the A/D conversion unit 102.

The distance information acquisition unit 202 acquires a distance to each subject using the multi-viewpoint image data received from the A/D conversion unit 102. It may also be possible to acquire the distance by calculating an optical flow between images of each subject or by measuring the distance to each subject by a distance measuring sensor. In the present embodiment, it is assumed that the distance to each subject is expressed in units of pixels, but the distance may be expressed, for example, for each predetermined region, such as in units of blocks including a plurality of pixels.

The virtual sensor position calculation unit 203 calculates a position at which the image of the subject determined by the subject determination unit 103 is formed. The calculated position information of the virtual sensor (virtual sensor position information) is sent to the filtering unit 204 and to the image composite unit 206.

The filtering unit (filter processing unit) 204 performs filter processing. Specifically, the filtering unit 204 calculates a coefficient of a filter based on the position of the virtual sensor, the distance to the subject, and the characteristic values (parameters) of the image capturing unit 101 and causes the filter to act on the image data at each viewpoint. The parameters indicating the characteristics of the image capturing unit 101 are input through a camera parameter input terminal (not shown schematically) and the data of the image (blurred image) on which the filter has been caused to act is sent to the blurred image buffer 205. The filtering unit 204 will be explained again later in detail.

The blurred image buffer 205 temporarily stores the blurred image data received from the filtering unit 204.

The image composite unit (generation unit) 206 weights each of the blurred image group on which the filtering unit 204 has caused the filter to act, align each piece of the blurred image data in accordance with the virtual sensor position, and performs addition to generate composite image data. The generated composite image data is output to the display unit 105 via a composite image data output terminal (not shown schematically).

Image Composite Unit

First, the image composite unit 206 is explained in detail.

Figure 3:
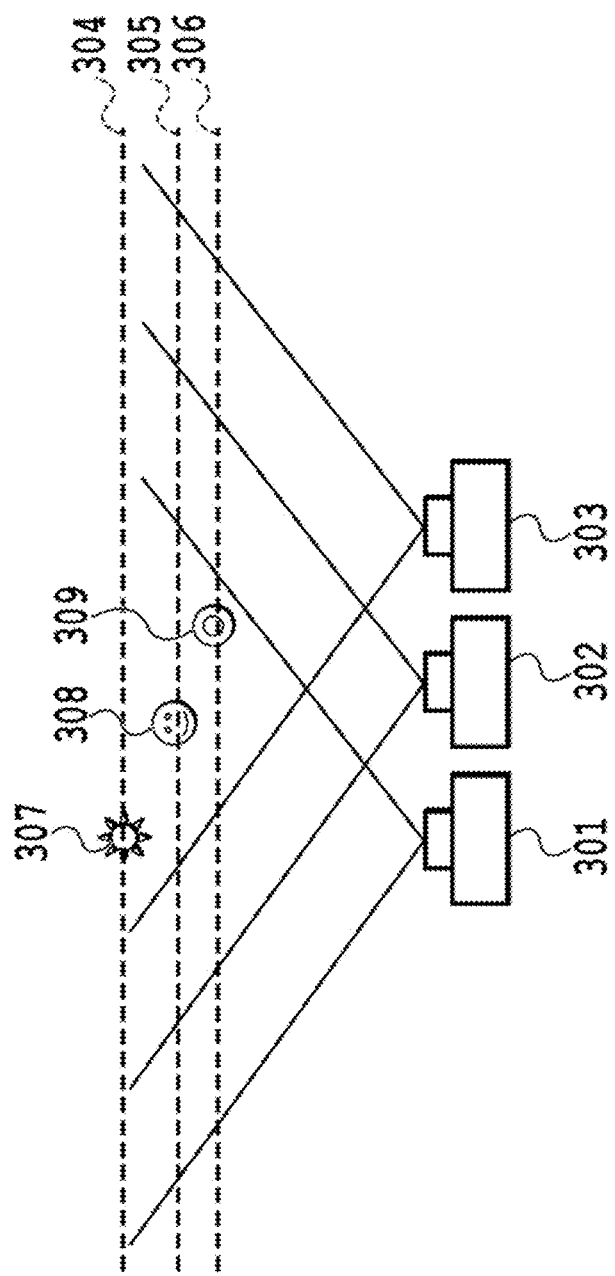
FIG. 3 is a diagram showing the way compact cameras configuring part of a camera array capture images of subjects located at different distances.
Figure 4:
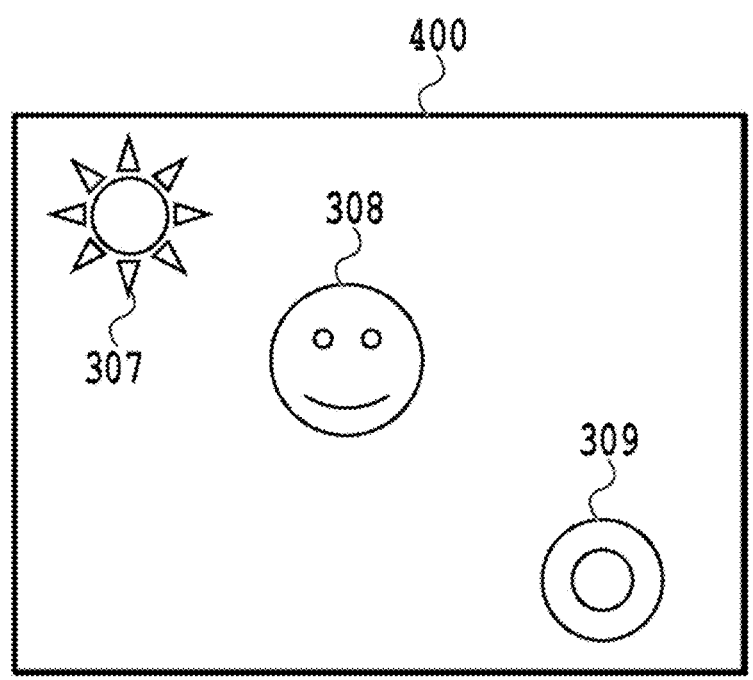
FIG. 4 is a diagram showing an example of an image acquired by the compact camera.

FIG. 3 is a diagram showing the way compact cameras 301 to 303 configuring part of the camera array capture images of subjects 307 to 309 located at different distances, respectively. Reference numerals 304 to 306 represent positions of the virtual sensor, respectively. FIG. 4 shows an image (400) acquired by the compact camera 301. Although not shown schematically, an image acquired by the compact camera 302 or 303 is an image in which the subject deviates by an amount corresponding to the parallax in accordance with the distance of each of the subjects 307 to 309.

The image composite unit 206 assigns a certain weight to each of the three images acquired by the compact cameras 301 to 303 and aligns the positions in accordance with the virtual sensor positions and adds the images.

Figure 5:
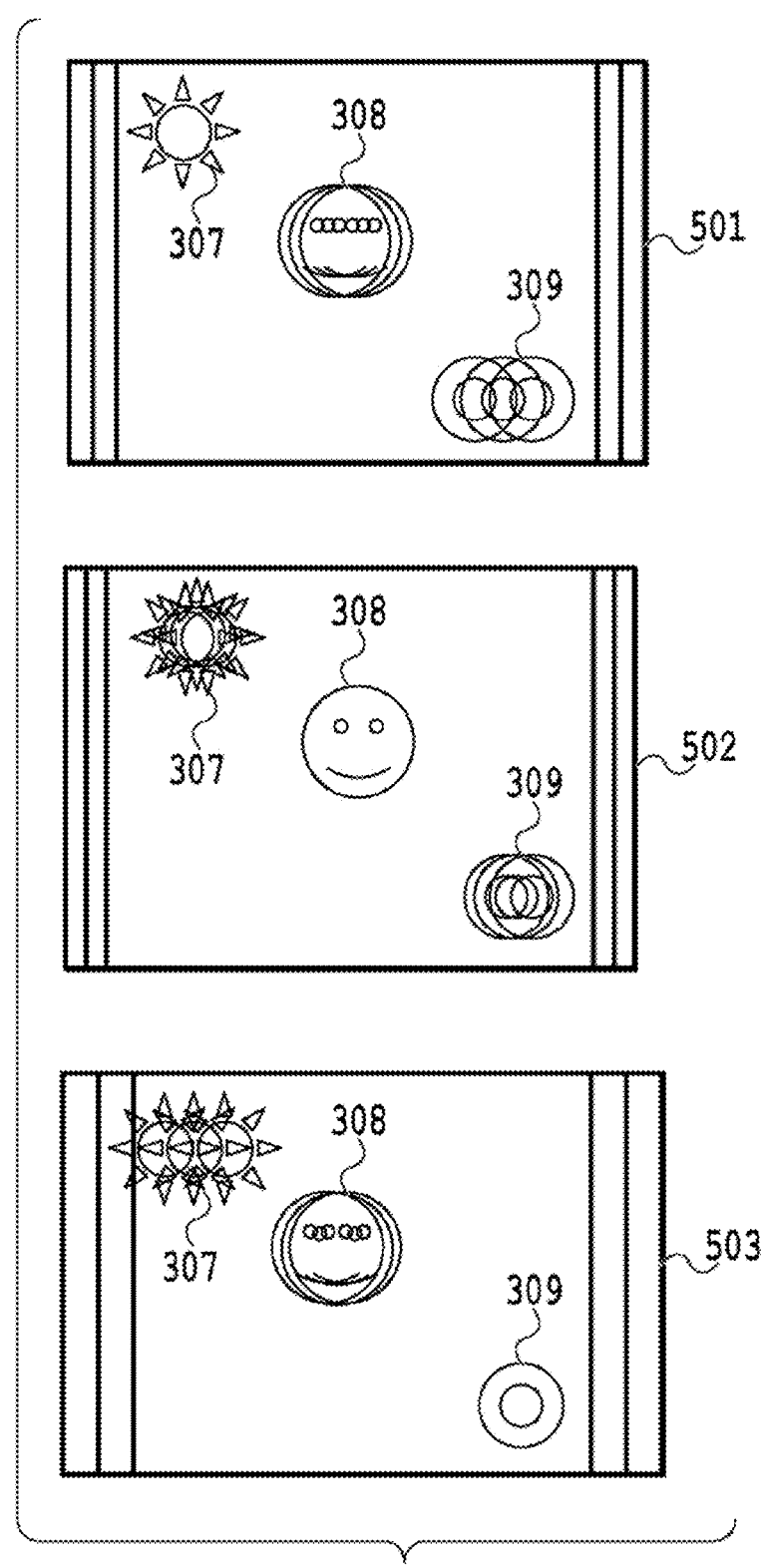
FIG. 5 shows conceptual diagrams of images combined by an image composite unit.

FIG. 5 is a conceptual diagram of images combined by the image composite unit 206. Reference numeral 501 represents an image after composition when the focus position is set to 304. In 501, the subject 307 is in focus and a blur occurs in the subjects 308 and 309. Further, the subject 309 is more blurred than the subject 308.

Then, reference numeral 502 represents an image after composition when the focus position is set to 305 and 503 represents an image after composition when the focus position is set to 306. In 502, the subject 308 is in focus and in 503, the subject 309 is in focus. By moving the focus position as described above, it is possible to obtain an image in which a desired subject is in focus.

However, in this state, an artifact will occur (for details, see the explanation of a filter diameter calculation unit 402), and therefore, in the present embodiment, the images captured by the compact cameras 301 to 303 are blurred in accordance with the distances from the focus position by the filtering unit 204 causing a filter to act thereon.

Subsequently, a flow of the processing in the image quality improvement processing unit 104 is explained.

Figure 6:
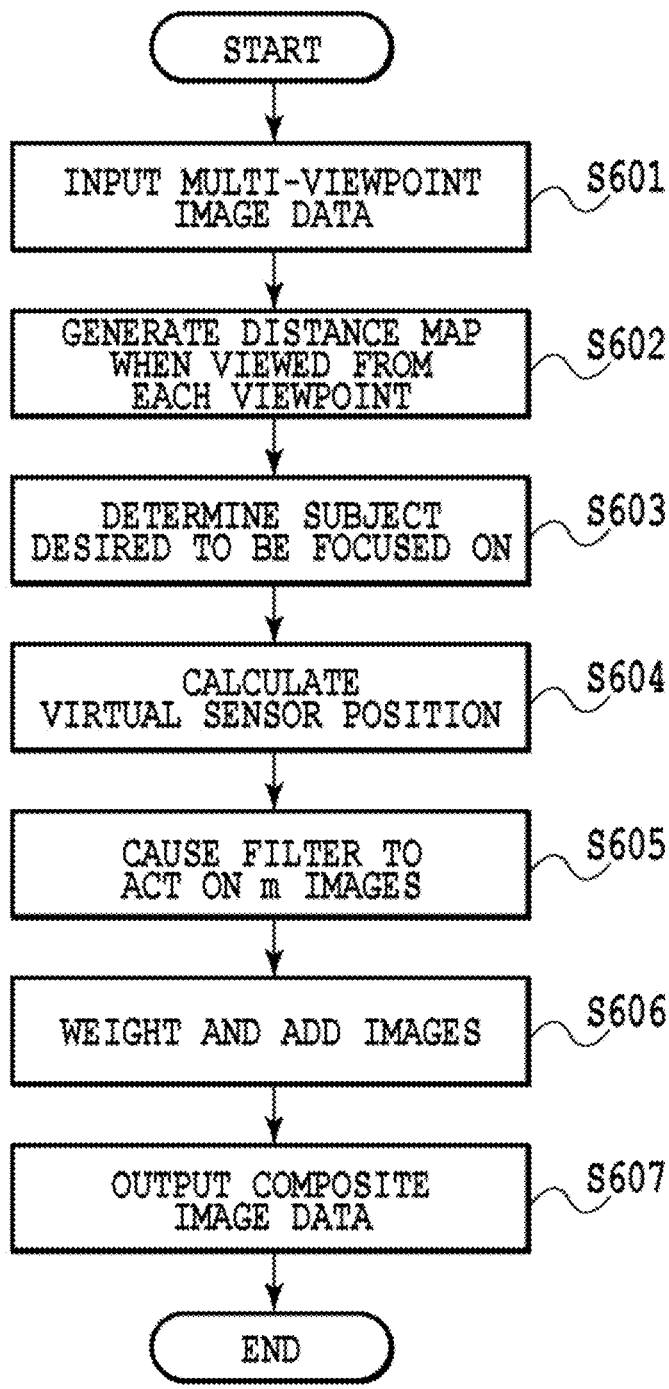
FIG. 6 is a flowchart showing a flow of processing in the image quality improvement processing unit.

FIG. 6 is a flowchart showing a flow of the processing in the image quality improvement processing unit 104.

In step 601, the image quality improvement processing unit 104 receives multi-viewpoint image data from the A/D conversion unit 102 through an image data input terminal (not shown schematically). The received multi-viewpoint image data is sent to the image buffer 201 and the distance information acquisition unit 202.

Figure 7:
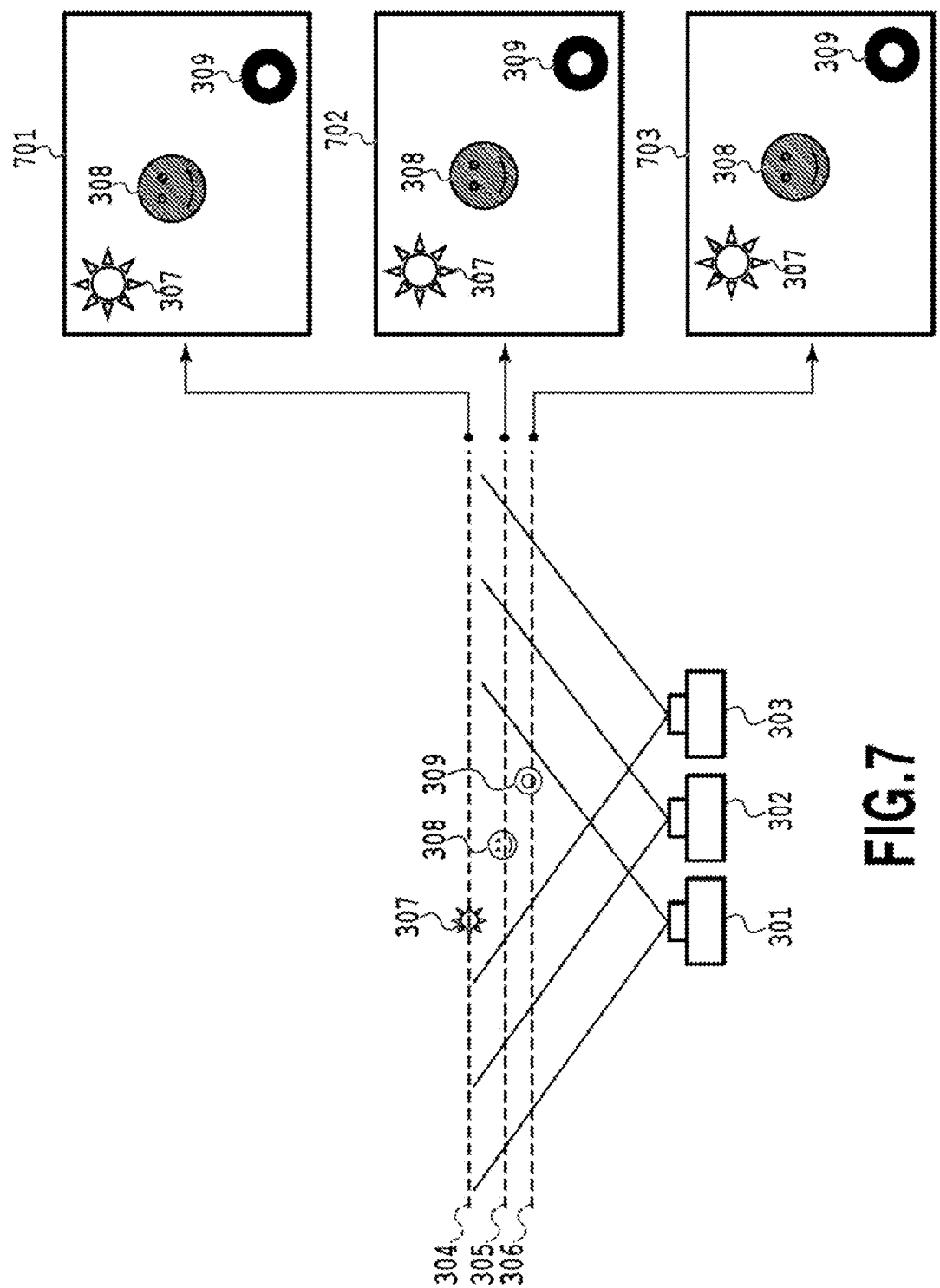
FIG. 7 is a conceptual diagram for explaining a distance map.
Figure 23:
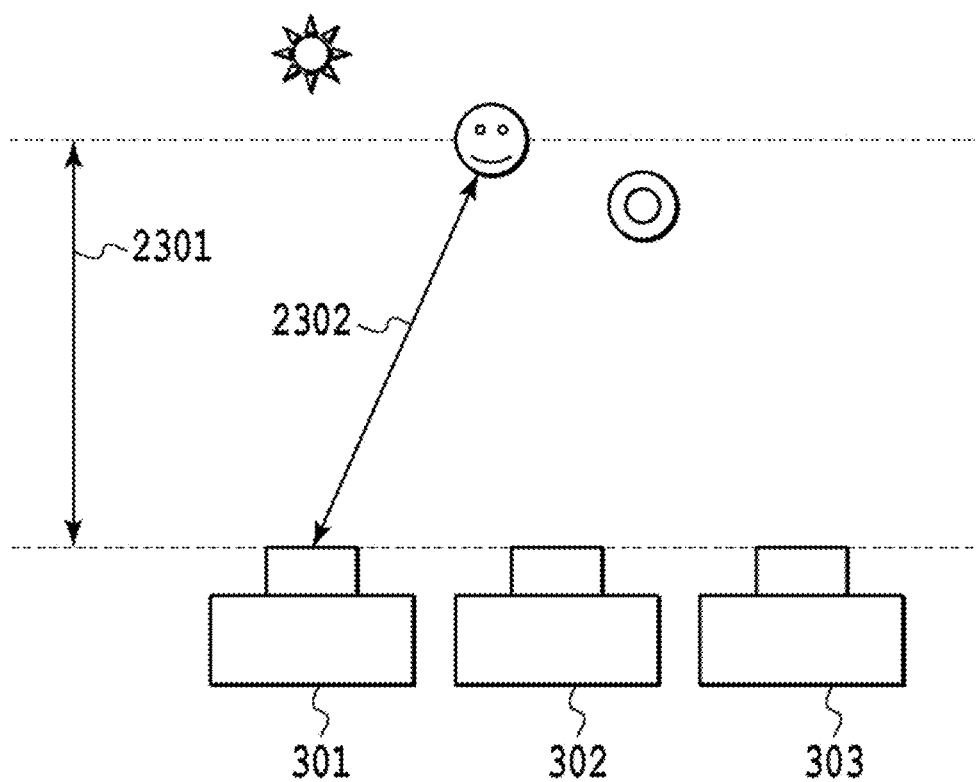
FIG. 23 is a diagram showing the definition of distance.

In step 602, the distance information acquisition unit 202 of the image quality improvement processing unit 104 calculates the distance to the subject when viewed from each viewpoint using the received multi-viewpoint image data and generates a distance map. Here, the definition of the distance is shown in FIG. 23. Reference numeral 2301 represents a distance from the compact camera 301 to the subject 308. The distance in the present embodiment refers to the length from the compact camera to the subject measured along the direction parallel to the optical axis as represented by 2301. However, the definition of the distance is not limited to this and it may also be possible to use the direct distance from the compact camera 301 to the subject 308 as represented by 2302. The distance map refers to data in which a distance value to a subject corresponding to a pixel instead of the pixel value in an image viewed from a certain viewpoint is stored. FIG. 7 is a conceptual diagram for explaining the distance map. In FIG. 7, reference numerals 701 to 703 represent the distance maps as images, respectively, when the images are captured by the compact cameras 301 to 303. In the distance map to be generated, an actual distance value is stored, but, to make it possible to understand that intuitively, the distance value is normalized to [0, 255] and represented as an image. The subject 307 is represented in white, the subject 308 is in gray, and the subject 309 is in black, and this means that the subject 307 exits far (at a deep position) and the subject 309 exits near (at a less deep position). That is, the figures represent that the smaller the pixel value becomes (that is, the darker the subject becomes), the nearer the subject exits. In this example of the distance map, all the distance values of subjects (background) deeper than the subject 307 are rounded to the distance of the subject 307, and therefore, both the subject 307 and the background are represented in white.

Explanation returns to that of the flowchart of FIG. 6.

Figure 14:
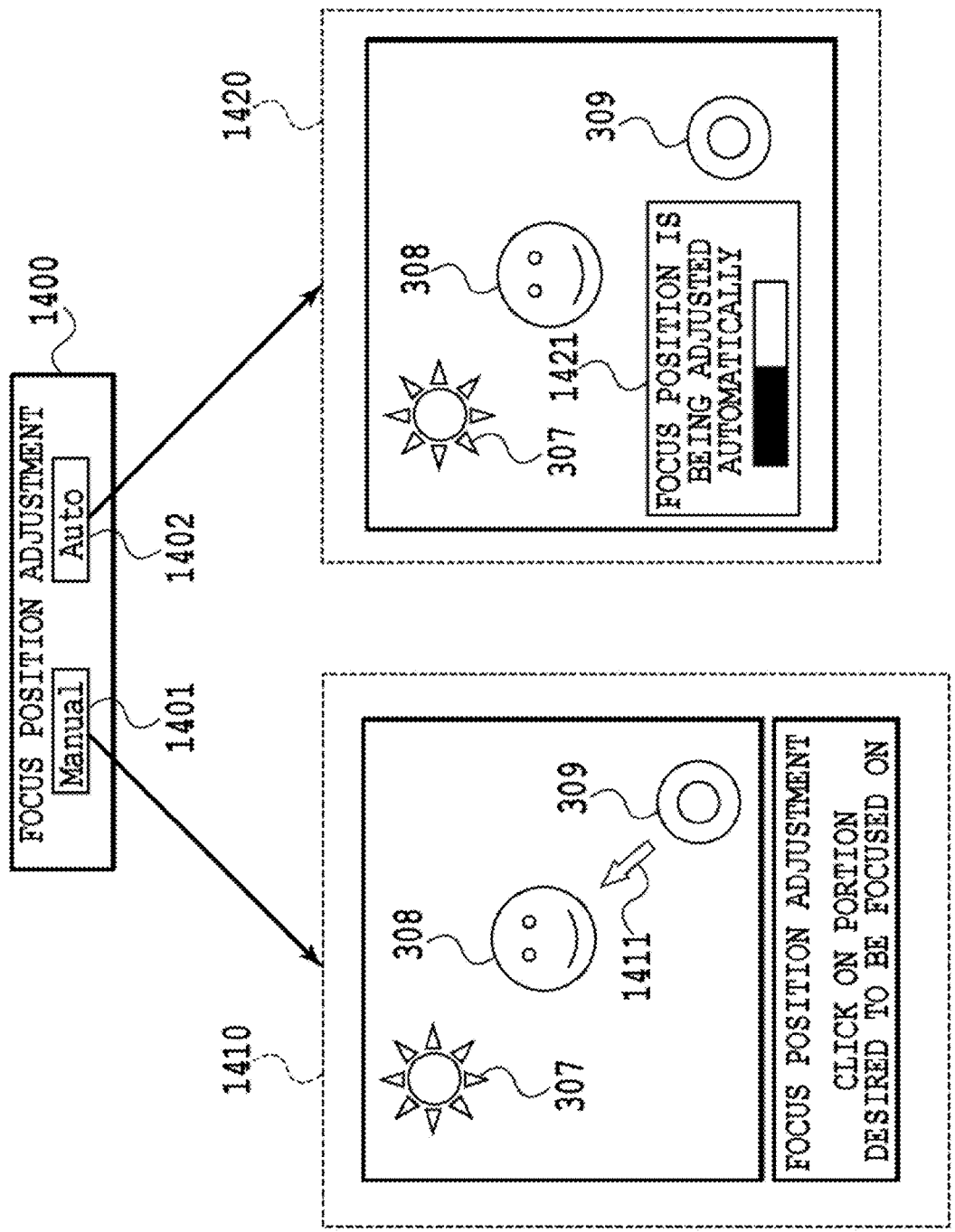
FIG. 14 is a diagram showing an example of a user interface screen used when determining a subject in a subject determination unit.

In step 603, the subject determination unit 103 determines a subject to be focused on. The subject determination unit 103 determines a subject to be focused on based on a user's specification or by predetermined automatic processing using the publicly-known face recognition technique etc. FIG. 14 shows an example of a user interface screen used when the subject determination unit 103 determines a subject. In FIG. 14, reference numeral 1400 represents a screen that is displayed at first when a user makes a focus position adjustment. On the screen 1400, there exist a Manual button 1401 that a user selects when the user desires to arbitrarily specify a subject to be focused on and an Auto button 1402 that a user selects when the user desires an automatic selection of a subject to be focused on. In this state, when a user presses down the Manual button 1401, the screen switches to a screen 1410 and when a user presses down the Auto button 1402, the screen switches to a screen 1420. On the screen 1410, when a user aligns a cursor 1411 with a subject on which the user desires to focus and clicks thereon, a subject to be focused on is determined. On the other hand, on the screen 1420 that is displayed when the Auto button 1402 is pressed down, a progress bar 1421 is displayed, which displays the progress of processing to automatically perform focusing. The contents of the automatic processing may be any method as long as focusing is performed by reflecting the needs of a user. Further, on the screen 1410 and the screen 1420, it may also be possible to display one image acquired by either of the compact cameras as a representative image or to display an image combined by assigning an appropriate weight at an appropriate virtual sensor position.

Information of the subject to be focused on determined in step 603 (focus position information) is sent to the virtual sensor position calculation unit 203 via a focus position input terminal (not shown schematically).

Explanation is returned to that of the flowchart of FIG. 6.

In step 604, the virtual sensor position calculation unit 203 calculates a position at which the image of the determined subject is formed based on the received focus position information.

In step 605, the filtering unit 204 causes a filter to act on each image captured by the compact camera configuring the camera array.

Figure 8:
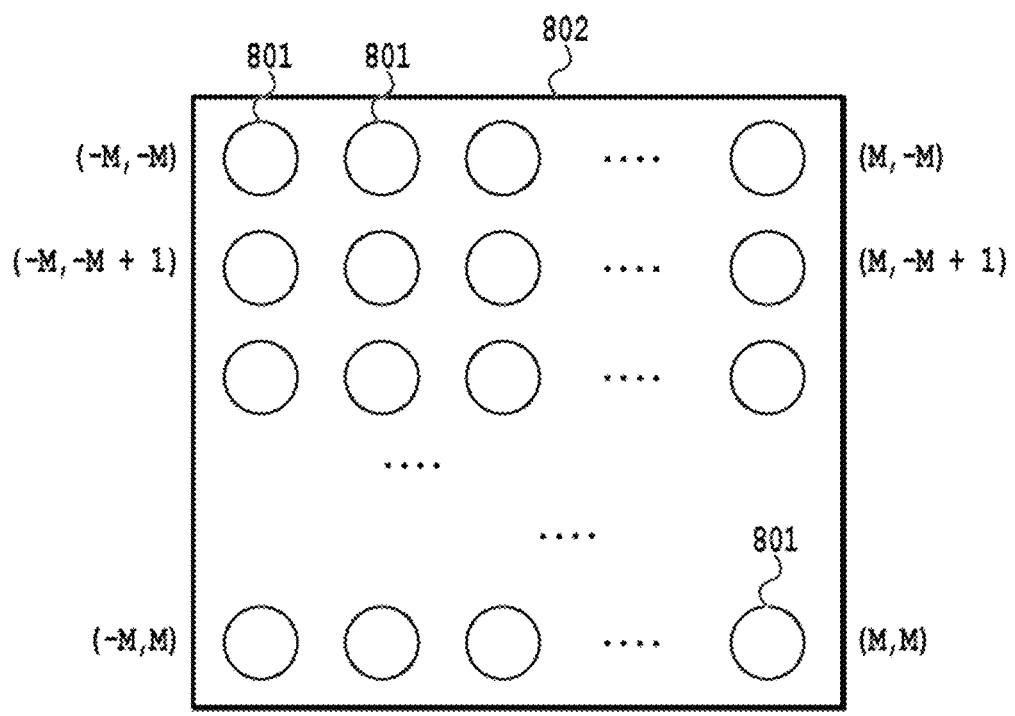
FIG. 8 is a diagram when the camera array is viewed from the front.

Here, the camera array of the image capturing unit 101 is explained. FIG. 8 is a view when the camera array of the image capturing unit 101 is viewed from the front. Reference numeral 801 represents each individual compact camera configuring the camera array and 802 represents a plane on which the compact cameras 801 are arranged. To each of the compact cameras 801, a number is attached from the upper-left camera 801 to the bottom-right camera 801 in order of (−M,−M), (−M+1,−M), . . . (M−1,M), and (M,M). Here, an example is shown in which the number of the compact cameras 801 is $(2M+1)^2$ in total, the number of the compact cameras 801 being the same in the vertical direction and in the horizontal direction, but, it may also be possible to arrange the compact cameras 801 in any number in the vertical direction and in the horizontal direction. First, the filtering unit 204 sets the number m of a target compact camera to m=(−M,−M) and calculates a filter coefficient based on the distance to the subject when viewed from the set m-th compact camera, the virtual sensor position, and the parameters indicating the characteristics of the image capturing unit 101. Then, the filtering unit 204 generates data of a blurred image by causing a filter to act on the image captured by the set m-th compact camera. The generated data of blurred image is stored in the blurred image buffer 205. Such a series of processing is performed until m=(M,M) is reached. The processing of the filtering unit 204 will be explained in detail using a different flowchart.

In step 606, the image composite unit 206 generates composite image data by multiplying the blurred image data at each viewpoint by a weight and then performing addition.

In step 607, the image composite unit 206 outputs the generated composite image data to the display unit 105 via a composite image data output terminal (not shown schematically) and exits the processing.

As described above, in the present embodiment, composite image data is obtained by blurring each viewpoint image in accordance with the distance of the subject from the focus position and the interval of the compact cameras and by weighting and adding the obtained blurred images.

In the present embodiment, before the image data is combined in the image composite unit 206, a filter is caused to act on the multi-viewpoint image data acquired by each compact camera, but, it may also be possible to reverse the order of processing. That is, it may also be possible to configure an image processing apparatus that generates a composite image using multi-viewpoint image data captured by an image capturing unit so as to comprise a subject determination unit configured to determine a subject to be focused on in each image of the multi-viewpoint image data, a virtual sensor position calculation unit configured to calculate a virtual sensor position at which the image of the determined subject is formed, a distance information acquisition unit configured to calculate information of the distance to the determined subject, an image composite unit configured to combine each of the images, and a filtering unit configured to cause a filter to act on each of the images combined by the image composite unit based on the virtual sensor position calculated by the virtual sensor position calculation unit, the information of the distance calculated by the distance information acquisition unit, and the characteristic values of the image capturing unit. In such a configuration, first, the image composite unit 206 combines image data and then a filter is caused to act on the generated composite image data in accordance with the distance from the position (focus plane) at which the image indicated by the composite image data is focused on. Then, in this case, it is required to use only one distance map when viewed from the same viewpoint as that of the composite image data.

Further, in the present embodiment, the multi-viewpoint image data is obtained by one-time image capturing by the image capturing device having an image capturing unit adopting a camera array. However, for example, it may also be possible to obtain multi-viewpoint image data by using only one image capturing device having a single-lens image capturing unit configured to capture one image by one-time image capturing and by capturing an image a plurality of times while deviating the viewpoint. In such a case, it is possible to handle the image data as in the case where images are captured by the image capturing device having the image capturing unit adopting the camera array by attaching a number to the image capturing device at each time when the image is captured.

(Processing in the Filtering Unit 204)

Next, as the processing in the filtering unit 204, an example is explained in detail in which a Gaussian distribution low-pass filter is used. The low-pass filter is a filter that concentrates more power in the region of frequencies lower than in the region in focus for regions other than the region in focus. The Gaussian distribution low-pass filter is an example and it is needless to say that any filter can be applied as long as the filter blurs an image, such as a moving average filter in which all weight coefficients are equal.

Figure 9:
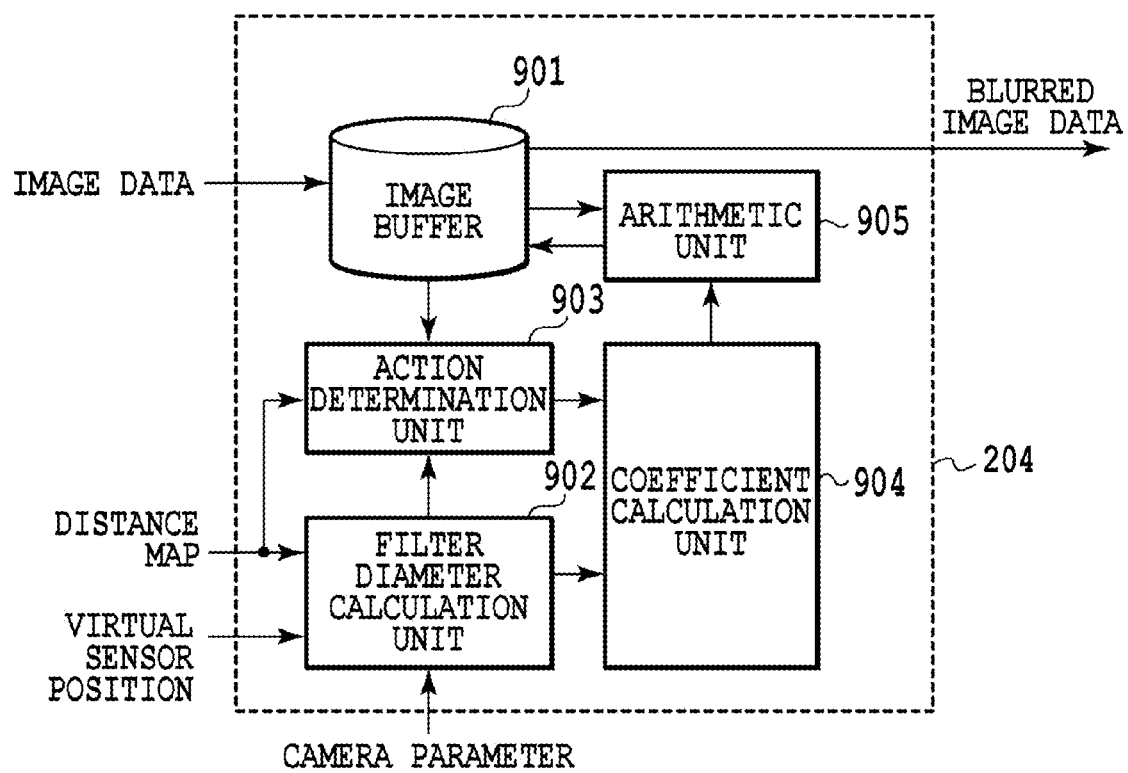
FIG. 9 is a block diagram showing an internal configuration of a filtering unit.

FIG. 9 is a block diagram showing an internal configuration of the filtering unit 204.

An image buffer 901 temporarily stores image data received from the image buffer 201 within the image quality improvement processing unit 104.

Figure 10A:
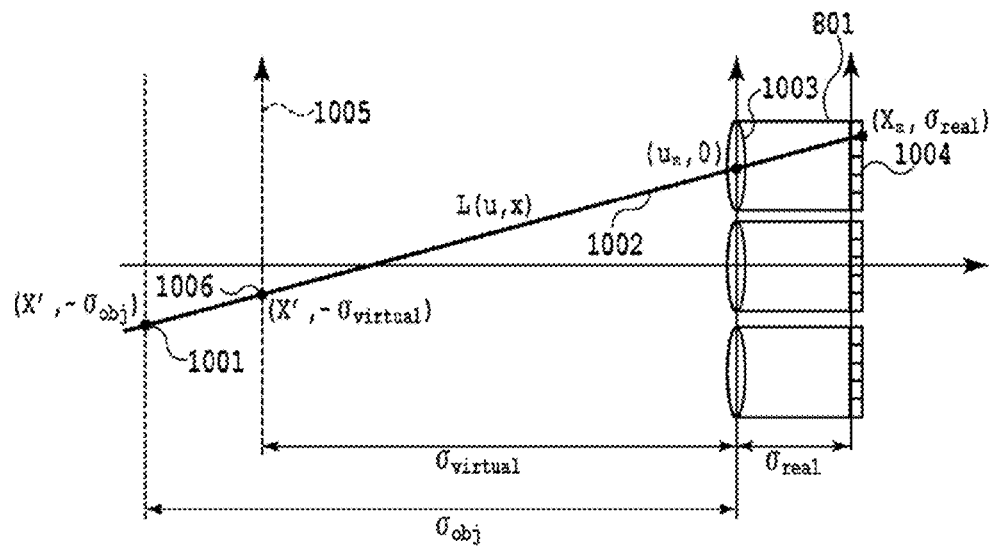
FIG. 10A is a diagram of part 1 for explaining the principles of filter diameter calculation.
Figure 10B:
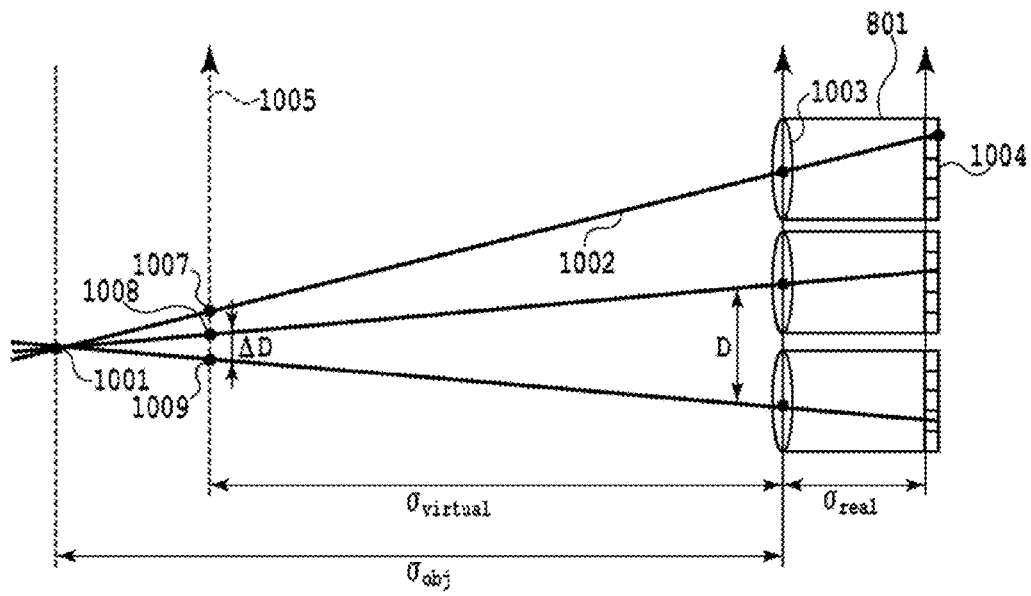
FIG. 10B is a diagram of part 2 for explaining the principles of filter diameter calculation.

A filter diameter calculation unit 902 calculates the number of taps (cells) of the filter of the target pixel and the number of taps of the filter of the peripheral pixel thereof, respectively, using the distance map and the virtual sensor position information. FIGS. 10A and 10B are diagrams for explaining the principles of filter diameter calculation. FIG. 10A is a section view cut in a plane perpendicular to the plane 802 of FIG. 8 previously described and passing through the center of the optical axis of the compact camera 801. Reference numeral 1001 represents a subject and 1003 represents a lens of the compact camera 801. Reference numeral 1002 represents a light beam connecting the center of the optical axis of the lens 1003 and the subject 1001. Reference numeral 1004 represents an image capturing element of the compact camera 801. Reference numeral 1005 represents a virtual sensor (plane virtually provided in order to derive what image would be obtained on the assumption that the image capturing element is located at a certain position by calculation after image capturing). Reference numeral 1006 represents an intersection of the light beam 1002 and the virtual sensor 1005. In the case of a subject that is in focus on the virtual sensor 1005, the subject 1001 exists on the virtual sensor 1005 and the intersection 1006 and the subject 1001 agree with each other as a result. Here, it is assumed that:

The distance between the image capturing element 1004 and the lens 1003 is $\sigma_{real}$, the distance between the virtual sensor 1005 and the lens 1003 is $\sigma_{virtual}$, and the distance between the subject 1001 and the lens 1003 is $\sigma_{obj}$ (when each of the compact cameras 801 includes the zoom function, $\sigma_{real}$ is a variable parameter);

The coordinates of the center of the optical axis of the lens 1003 of the m-th compact camera 801 are $(u_m, 0)$ and the coordinates of the image capturing element 1004 are $(x_m, \sigma_{real})$;

The coordinates of the subject 1001 are $(X', -\sigma_{obj})$ the coordinates of the intersection 1006 are $(X, -\sigma_{virtual})$, and $\sigma_{virtual}$ in this case takes a positive value;

The intensity of light acquired at the coordinates $(x_m, \sigma_{real})$ of the image capturing element 1004 under the m-th compact camera 801 is $L(u_m, x_m)$ (the argument means the light is alight beam connecting $u_m$ and $x_m$); and The symbols $u_m, x_m$, X, and X' represent two-dimensional vectors, respectively, on the plane 802.

In FIG. 10B, it is assumed that the subject 1001 is a point light source and when the subject 1001 is projected onto the virtual sensor plane 1005, points are distributed separate from one another on the virtual sensor plane 1005 as shown by 1007 to 1009. Reference numerals 1007, 1008, and 1009 are point images, respectively, when the point light source 1001 is projected onto the virtual sensor plane 1005. Reference symbol D represents the interval between the neighboring compact cameras. At this time, an interval ΔD of each of the point images 1007 to 1009 is expressed by Expression below from the relationship of similarity.

[Formula 1]

$$\Delta D = \frac{|\sigma_{virtual} - \sigma_{obj}|}{\sigma_{obj}} D \qquad \text{Expression (1)}$$

Then, the interval of the point images 1007 to 1009 is reduced to $\sigma_{real}/\sigma_{virtual}$ on the image capturing element 1004, and therefore, an interval ΔD' of the point images 1007 to 1009 on the image capturing element 1004 is expressed by Expression below.

[Formula 2]

$$\Delta D' = \frac{\sigma_{real}}{\sigma_{virtual}} \Delta D \equiv |\alpha - \alpha_{obj}| D \quad \text{Expression (2)}$$

Here, it is assumed that $\alpha \equiv \sigma_{real}/\sigma_{virtual}$, $\alpha_{obj} \equiv \sigma_{real}/\sigma_{obj}$. The cause of the occurrence of an artifact in a blur is the projection of point images onto the virtual sensor separate from one another.

In order to suppress the artifact, the image on the virtual is blurred by a filter acting thereon. By this, the blur of the point light source on the virtual sensor is made smooth. The filter diameter calculation unit 902 in the present embodiment calculates the number of taps a of the filter by dividing the case into the following cases by taking A and $\epsilon$ to be appropriate constant values.

Case 1) When $|\alpha - \alpha_{obj}(x,y)|D < \epsilon$, $\sigma(x,y)=0$ is set.
Case 2) When $\epsilon \le |\alpha - \alpha_{obj}(x,y)|D$, $\sigma(x,y) = A|\alpha - \alpha_{obj}(x,y)|D$ is set.

Case 1) means that no filter is caused to act on the subject in the vicinity of the focus position and Case 2) means that a filter is caused to act on the subject out of the focus position.

However, when the subject on the focus plane is resolved sufficiently and the blur of the subject at the position other than the focus position is made smooth, the method for determining the number of taps of the filter is not limited to Cases 1) and 2).

In the manner described above, the filter diameter calculation unit 902 calculates the number of taps of the filter by referring to the distance to the subject, the position of the virtual sensor, and the value of the interval of the compact cameras. When an image is captured a plurality of times using one camera, D is the distance between cameras at each time.

An action determination unit 903 determines whether or not to multiply the peripheral pixel value by a coefficient and add the product to the target pixel value by comparing the magnitude of the distances of the target pixel and the peripheral pixel. Details of the determination processing in the action determination unit 903 are described later.

A coefficient calculation unit 904 calculates a coefficient indicating an influence of the peripheral pixel on the target pixel.

An arithmetic unit 905 multiplies the pixel value of the peripheral pixel by the coefficient calculated by the coefficient calculation unit 904 and adds the product to the target pixel value of the blurred image read from the image buffer 901.

Figure 11B:
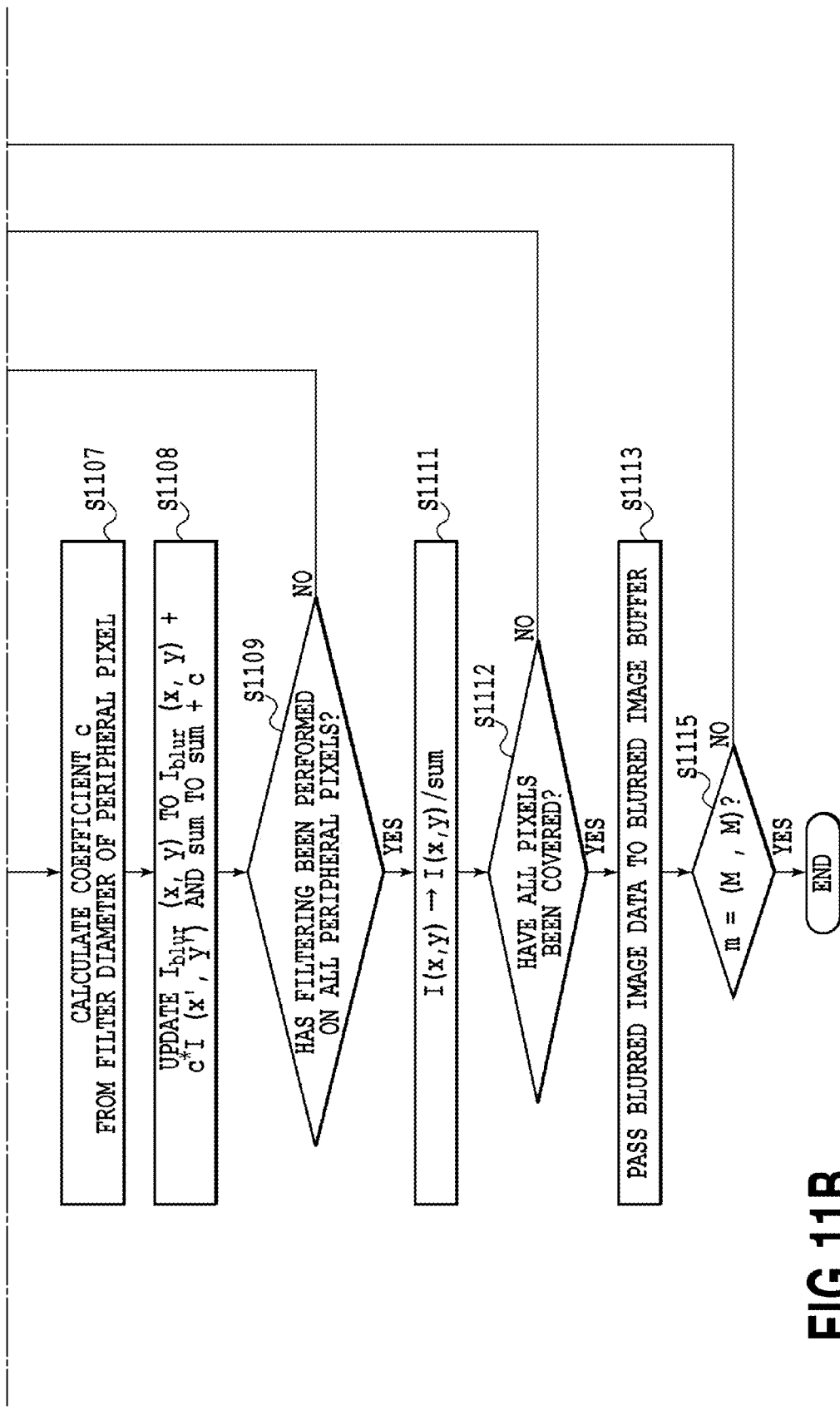

FIG. 11 is a flowchart showing a flow of processing in the filtering unit 204.

In step 1101, first, the filtering unit 204 sets the number m of the target compact camera of the plurality of compact cameras configuring the camera array to m=(-M,-M).

In step 1102, the filtering unit 204 receives the image data of the target compact camera m through an image data input terminal (not shown schematically). The received image data is stored in the image buffer 901.

In step 1103, the filtering unit 204 sets a pixel position (x,y) of the target pixel to the initial value and sets the pixel values of all the pixels of a blurred image $I_{blur}$ stored in the image buffer 901 to zero. In this case, it is assumed that the initial value of the pixel position of the target pixel is taken to be that of the pixel located at the uppermost and leftmost position of the image and the initial value is updated sequentially from the upper-left pixel position to the bottom-right pixel position.

In step 1104, the filtering unit 204 sets a pixel position (x',y') of the peripheral pixel to the initial value and a sum of coefficients sum to zero.

In step 1105, the filter diameter calculation unit 902 calculates the filter diameters of the target pixel and the peripheral pixel, that is, the number of taps $\sigma(x,y)$ of the filter of the target pixel and the number of taps $\sigma(x',y')$ of the filter of the peripheral pixel.

In step 1106, the action determination unit 903 determines whether the target pixel is one on which a filter is caused to act. That is, in this step, whether the target pixel is the pixel configuring the subject determined by the subject determination unit 103 and in focus is specified. Specifically, the depth of the subject the image of which is formed on the target pixel is taken to be d (x,y) and the depth of the subject the image of which is formed on the peripheral pixel is taken to be d (x',y') and determination is made using Expression (3) and Expression (4) below. Here, Expression (3) is a conditional formula to determine the presence/absence of occlusion of the target pixel and Expression (4) is a conditional formula to generate the blur clear.

[Formula 3]

$$d(x',y') < d(x,y) \quad \text{Expression (3)}$$

[Formula 4]

$$\sqrt{(x'-x)^2 + (y'-y)^2} \le \sigma(x,y) \quad \text{Expression (4)}$$

When both Expression (3) and Expression (4) are satisfied (the target pixel is a pixel on which a filter is caused to act), the procedure proceeds to step 1107. On the other hand, neither Expression (3) nor Expression (4) is satisfied (the target pixel is not a pixel on which a filter is caused to act), the procedure proceeds to step 1110. Expression (3) and Expression (4) are mere examples and any conditional formulas may be used as long as the blur can be made smooth finally by taking into consideration the influence of occlusion.

In step 1107, the coefficient calculation unit 904 calculates a coefficient c from the number of taps $\sigma(x',y')$ of the peripheral pixel. Here, it is assumed that the coefficient c is a Gaussian one and calculated using Expression below.

[Formula 5]

$$c = \frac{1}{2\pi\sigma(x',y')^2} \exp\left(-\frac{[(x-x')^2 + (y-y')^2]}{2\sigma(x',y')^2}\right) \quad \text{Expression (5)}$$

The coefficient is not limited to a Gaussian one as long as the blur can be made smooth.

In step 1108, the arithmetic unit 905 updates $I_{blur}$ and the coefficient sum sum of the target pixel. Specifically, Expressions below are used to update, respectively.

[Formula 6]

$$I_{blur}(x,y) \rightarrow I_{blur}(x,y) + cI(x',y') \quad \text{Expression (6)}$$

[Formula 7]

$$\text{sum} \rightarrow \text{sum} + c \quad \text{Expression (7)}$$

In step 1109, the filtering unit 204 determines whether all the (2S+1)×(2S+1) peripheral pixels of the target pixel have been subjected to the filtering. Here, it is assumed that the maximum value of the size of a filter caused to act is (2S+1)×(2S+1). When all the (2S+1)×(2S+1) peripheral pixels of the target pixel have been subjected to the processing, the procedure proceeds to step 1111. On the other hand, when all have not been subjected to the processing yet, the procedure proceeds to step 1110.

In step 1110, the filtering unit 204 updates the pixel position (x',y') of the peripheral pixel and the procedure returns to step 1105. The pixel position (x',y') of the peripheral pixel is updated in order of (x−S, y−S), (x−S+1,y−S), ... (x+S,y−S), (x−S,y−S+1), ... (x+S,y+S). That is, the pixel position (x',y') is updated from top-left to bottom-right of the square having a size of (2S+1)×(2S+1) with the target pixel position (x',y') as a center. However, when the pixel position of the peripheral pixel is outside the image, clipping is performed so that the pixel position is located within the image. It may also be possible to determine in advance the maximum value of the filter size or to determine based on the number of taps of the filter of the subject most distant from the focus position.

In step 1111, the arithmetic unit 905 divides I (x,y) by sum. I (x,y) as the result of the division is stored in the image buffer 901.

In step 1112, the filtering unit 204 determines whether the pixel position (x,y) of the target pixel has covered all the pixels. When the determination result is affirmative, the procedure proceeds to step 1113. On the other hand, when the determination result is negative, the procedure proceeds to step 1114.

In step 1113, the filtering unit 204 passes the blurred image data to the blurred image buffer 205. That is, the blurred image data including I (x,y) all the pixels of which have been subjected to the processing in step 1103 to step 1110 is sent to the blurred image buffer 205 and stored in the blurred image buffer 205.

In step 1114, the filtering unit 204 updates the pixel position (x,y) of the target and the procedure returns to step 1104.

In step 1115, the filtering unit 204 determines whether m=(M,M). When m has reached (M,M), the filtering unit 204 exits the processing. On the other hand, when m has not reached (M,M) yet, the procedure proceeds to step 1116.

In step 1116, the filtering unit 204 updates m and the procedure returns to step 1102 and the processing of steps 1102 to 1114 is repeated until m reaches (M,M).

The above is the processing in the filtering unit 204.

Figure 12A:
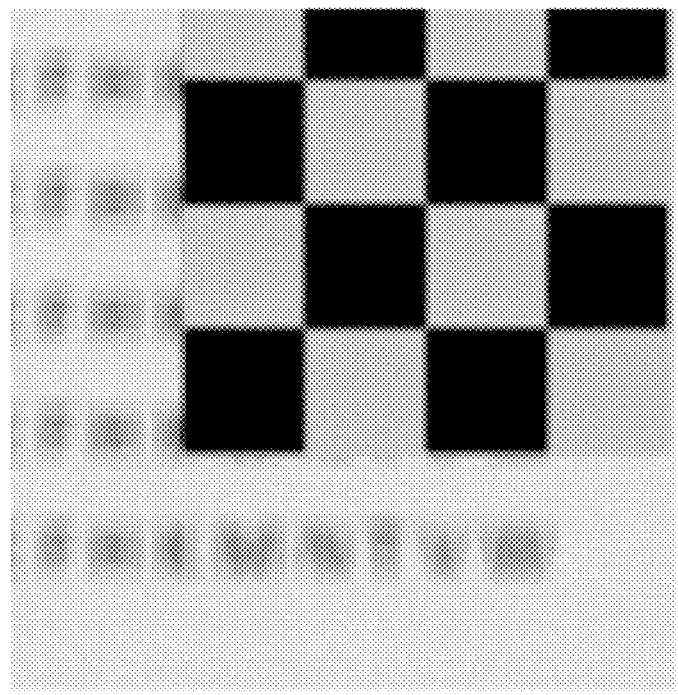
FIG. 12A is a photo when a prior art is applied.
Figure 12B:
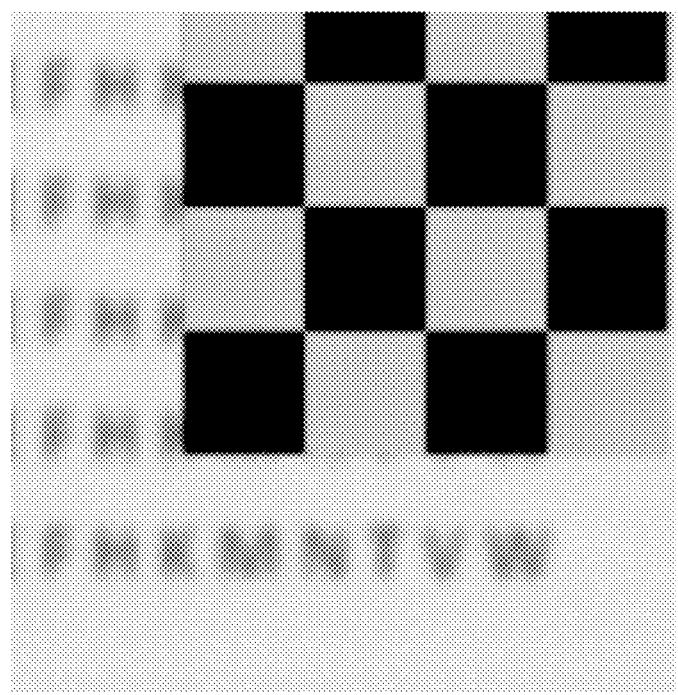
FIG. 12B is a photo when the image processing according to the first embodiment is applied.

FIGS. 12A and 12B are diagrams (photos) for explaining the effect when the image processing according to the present embodiment is performed. FIG. 12A shows the case where the prior art is applied (all the weights are made equal and images of respective viewpoints are added) and FIG. 12B shows the case where the present invention is applied, respectively. Both FIGS. 12A and 12B show the state where a checkered square is placed in front of a background of alphabets and the focus position is ahead of the square, but, the blurred part is smoother and of higher quality in FIG. 12B when the present invention is applied.

As described above, in the case of the present embodiment, filters of different tap lengths are caused to act on images in accordance with the distance of the subject from the focus plane and the images on which those filters have acted are aligned and added in accordance with the focus position. Due to this, it is possible to reproduce the smooth blur with a less amount of calculation compared to that of Japanese Patent Laid-Open No. 2009-211254 and it is possible to implement processing robust to a shape estimation error.

Second Embodiment

In the first embodiment, an aspect is explained in which a camera array using a plurality of compact cameras is adopted as the camera array image capturing unit 101. However, the configuration of the image capturing unit 101 in the present invention is not limited to the camera array. For example, it is also possible to adopt a Plenoptic camera in which a microlens array is placed behind a main lens. Here, as a second embodiment, a case is explained where a Plenoptic camera is adopted as the image capturing unit 101. Explanation of parts common to those of the first embodiment is omitted and different points are explained mainly.

Figure 13:
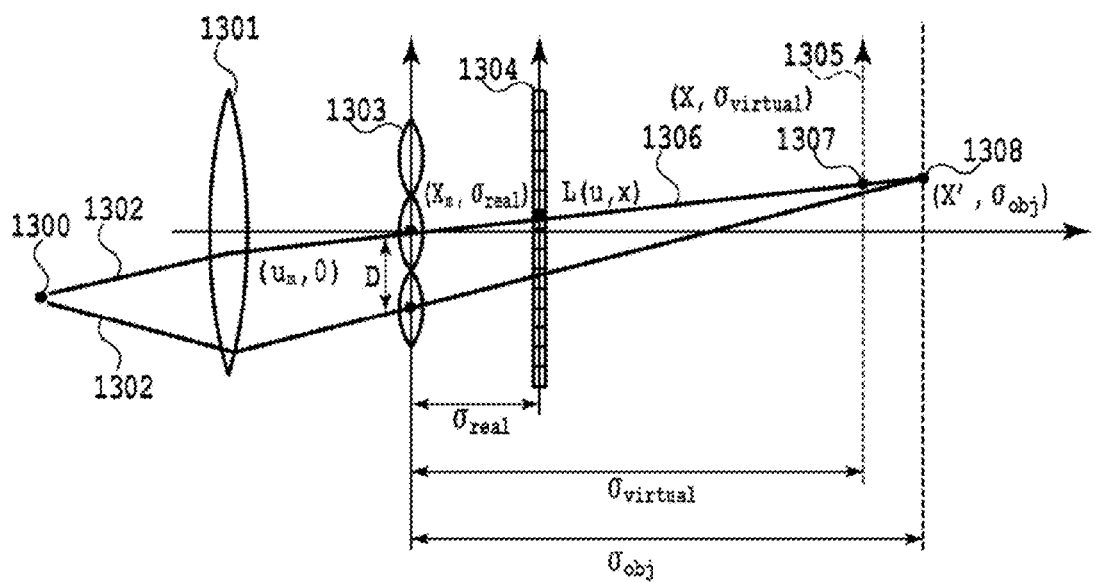
FIG. 13 is a principle explanatory diagram in the case of a Plenoptic camera.

FIG. 13 a diagram for explaining the principles of a Plenoptic camera, corresponding to FIG. 10A in the first embodiment. In FIG. 13, reference numeral 1300 represents a subject, 1302 represents a light beam emitted from the subject, 1301 represents a main lens, 1303 represents a microlens configuring a microlens array, 1304 represents an image capturing element, and 1305 represents a virtual sensor. Symbol D represents the interval between the neighboring microlenses 1303. Then, reference numeral 1306 represents a light beam passing through the center of the optical axis of the microlens 1303 of the light beams 1302 bent by the main lens 1301. A point at which the light beam 1306 forms an image is represented by reference numeral 1308, and 1307 represents an intersection of the virtual sensor 1305 and the light beam 1306. In this case, it is assumed that the coordinates of the image forming point 1308 are (X',$\sigma_{obj}$) the coordinates of the point obj 1307 are (X, $\sigma_{virtual}$), and $\sigma_{virtual}$ and $\sigma_{obj}$ take positive values.

In the case also, where the Plenoptic camera is adopted as the image capturing unit 101, the configuration and the processing contents of the image quality improvement processing unit 104 are the same as those of the first embodiment, and therefore, their explanation is omitted. However, it should be noted that in the processing in the filter diameter calculation unit 902 according to the present embodiment, the number of taps of the filter is calculated using $\sigma_{virtual}$ and $\sigma_{obj}$ shown in FIG. 13 described above.

It is possible to improve image quality by the same method also in the case where an image capturing unit configured to acquire LF by an aspect other than that of the camera array according to the first embodiment and the Plenoptic camera of the second embodiment is adopted as the configuration of the image capturing unit 101.

Third Embodiment

In the first and second embodiments, the method for smoothing a blur when adjusting the focus position after image capturing (refocus) is explained. Next, an aspect in which not only the focus position but also the depth of field is adjusted after image capturing while smoothing a blur is explained as a third embodiment.

Figure 15:
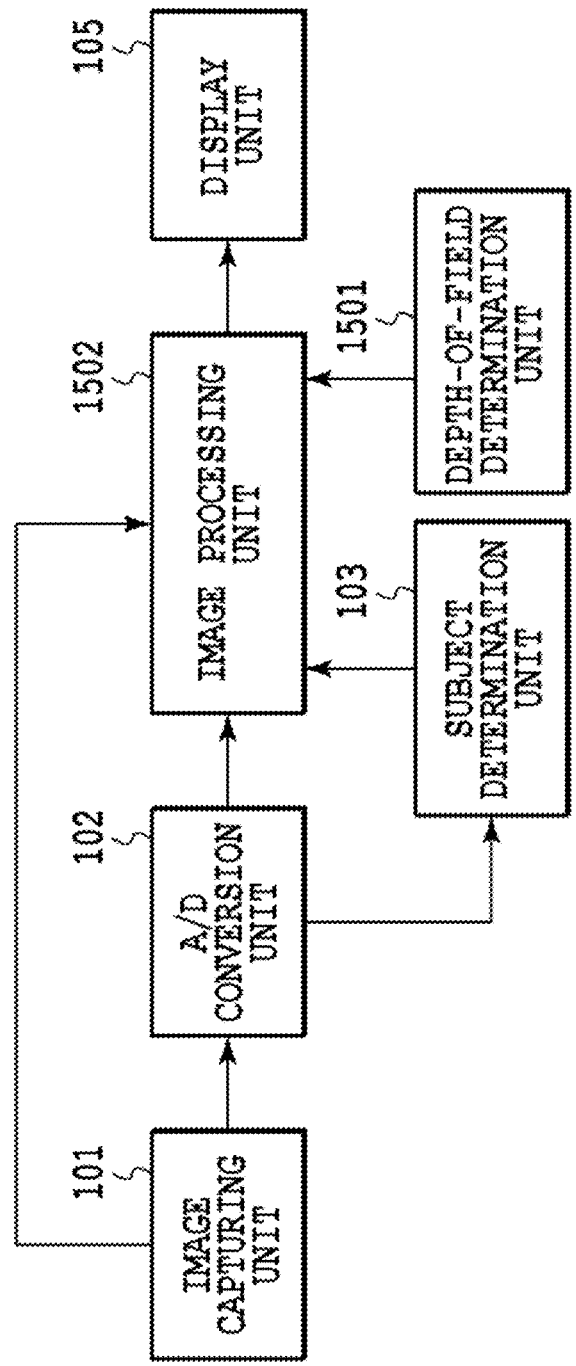
FIG. 15 is a diagram showing principal components of an image capturing device according to a third embodiment.

FIG. 15 is a diagram showing principal components of an image capturing device according to the present embodiment. Explanation of parts common to those of FIG. 1 according to the first embodiment is omitted and only different points are explained.

A depth-of-field determination unit 1501 determines a predetermined depth of field (F number) based on a user's instruction. A user specifies a desired F number by, for example, directly inputting a specific numerical value via an operation unit (user interface) not shown schematically, or by using a slide bar, etc.

An image processing unit 1502 outputs composite image data to the display unit 105 based on information input from the A/D conversion unit 102, the image capturing unit 101, the subject determination unit 103, and the depth-of-field determination unit 1501. It may also be possible to configure the image processing unit 1502 as an independent image processing apparatus.

Figure 16:
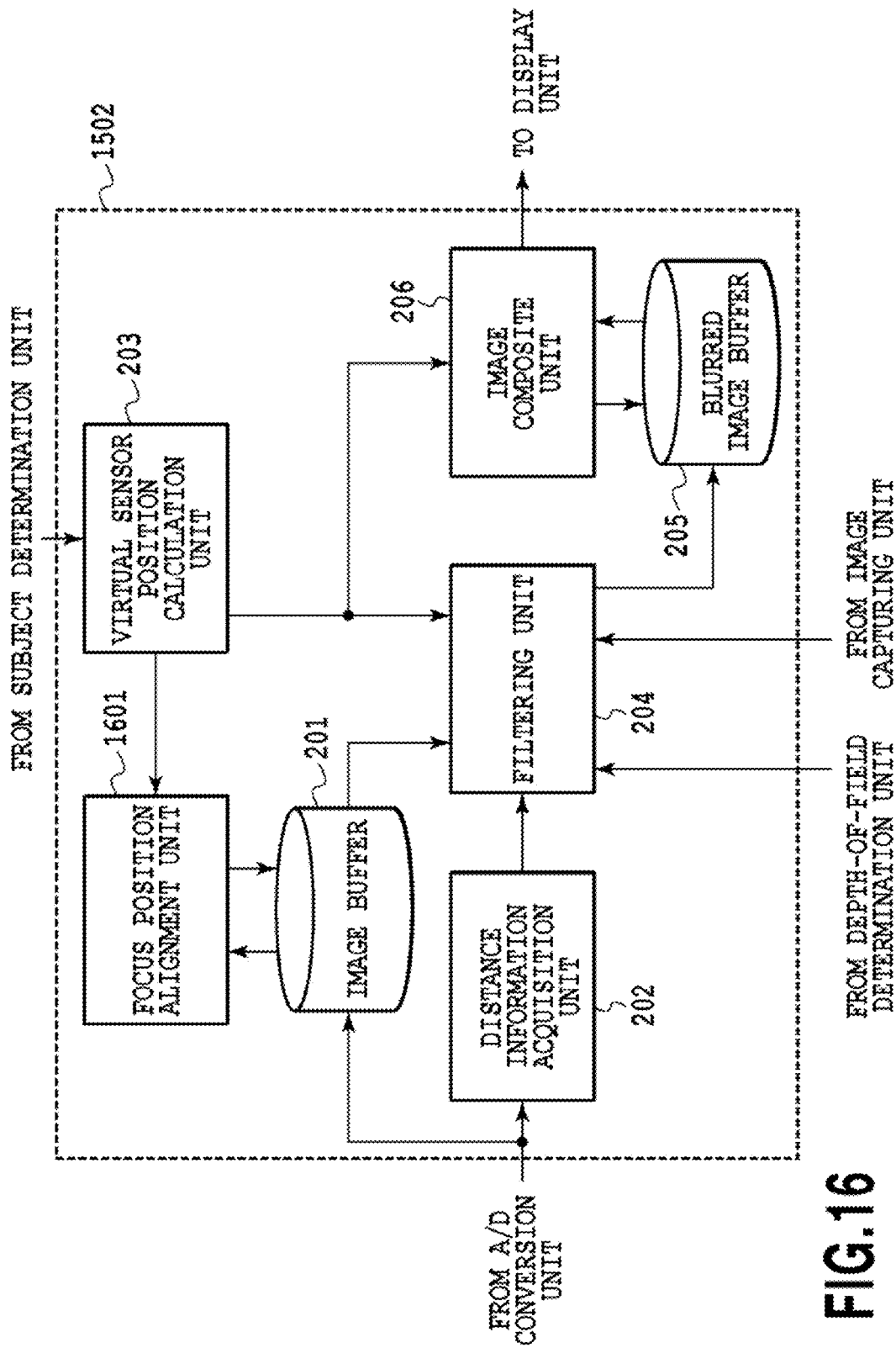
FIG. 16 is a diagram showing an example of an internal configuration of an image processing unit.

FIG. 16 is a diagram showing an example of an internal configuration of the image processing unit 1502. Here, only differences from FIG. 2 are explained.

A focus position alignment unit 1601 shifts the whole image so that the subject at the focus position is located at the same position within the image of each viewpoint using virtual sensor position information from the virtual sensor position calculation unit 203.

The filtering unit 204 calculates a filter coefficient based on the position of the virtual sensor, the distance to the subject, the characteristic values (parameters) of the image capturing unit 101, and the specified depth of field (F number). Then, a filter is caused to act on each viewpoint image and the image on which a filter is caused to act is stored in the blurred image buffer 205.

The image composite unit 206 generates composite image data by weighting each of the image group on which the filter is caused to act and adding them. The generated composite image data is output to the display unit 105 via a composite image data output terminal (not shown schematically).

Following the above, a flow of processing in the image processing unit 1502 is explained.

Figure 17:
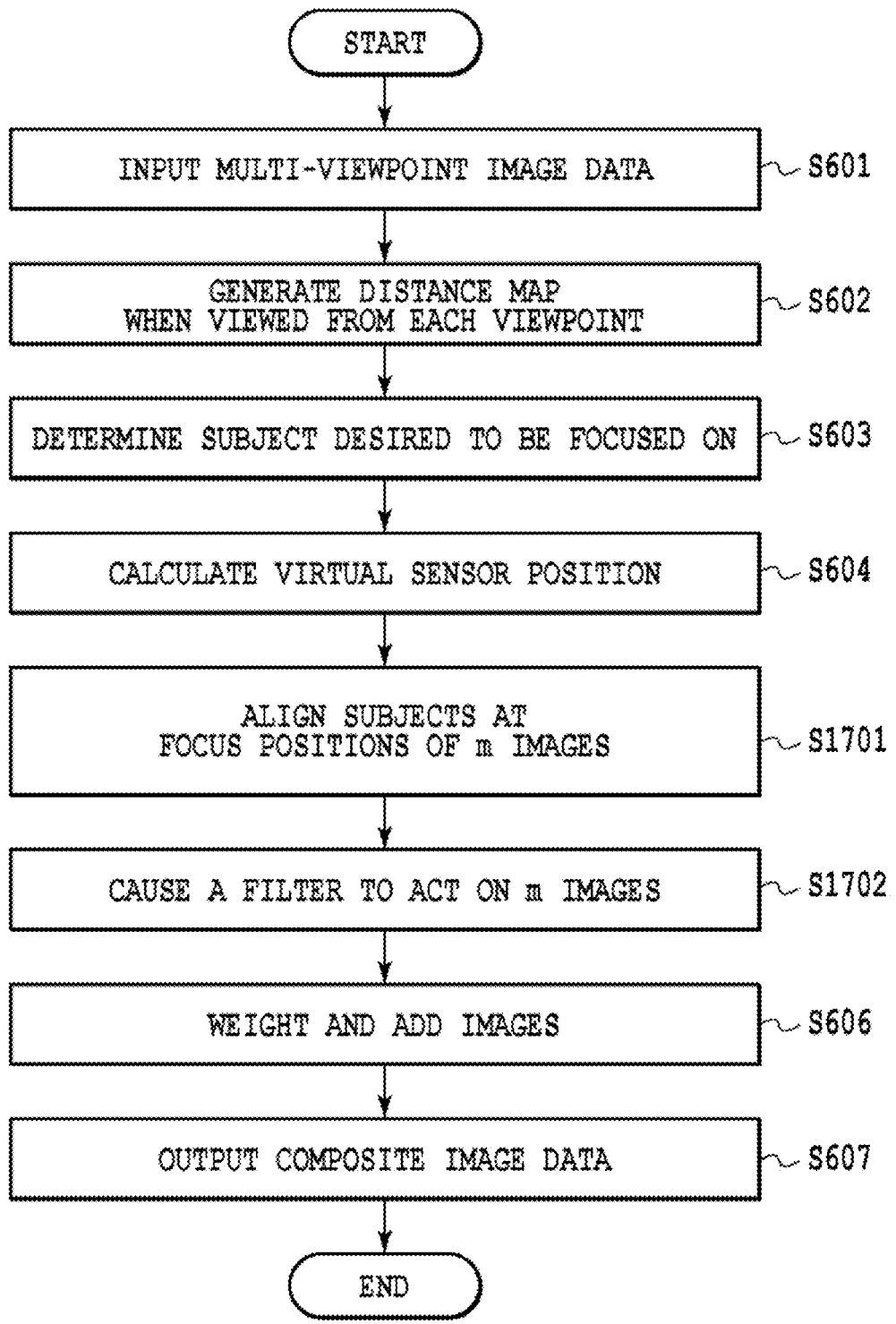
FIG. 17 is a flowchart showing a flow of processing in the image processing unit.

FIG. 17 is a flowchart showing a flow of processing in the image processing unit 1502. Detailed explanation of parts common to those of the flowchart of FIG. 6 of the first embodiment is omitted and here, different points are explained mainly.

After generating a distance map from input multi-viewpoint image data, determining a subject desired to be focused on, and calculating a position at which an image of the subject is formed (step 601 to 604), the procedure proceeds to step 1701.

In step 1701, a focus position alignment unit 1605 sets the number m of the target compact camera to (−M,−M) and shifts the whole image. FIG. 22 is a diagram showing the way the whole image is shifted. Here, it is assumed that a subject to be focused on is represented by reference numeral 308. In FIG. 22, reference numeral 2201 represents an image photographed by the (0,0)-th compact camera and 2202 represents an image photographed by the m-th compact camera. It is seen that there is a parallax corresponding to an amount represented by reference numeral 2203 in the subject 308 at the focus position between the images 2201 and 2202. An image 2204 shows a state where the whole image 2202 is shifted by an amount corresponding to a vector 2205 of the same quantity as the parallax quantity 2203. Here, a case is explained where the image is shifted in the horizontal direction, but, in a case where the m-th compact camera is in the oblique or vertical direction with respect to the (0,0)-th compact camera, the image may be shifted in the corresponding direction. Such a series of processing is repeated until m reaches (M,M).

In step 1702, the filtering unit 1607 sets the number m of the target compact camera to (−M,−M) and calculates a filter coefficient based on the distance to the subject when viewed from the compact camera, the virtual sensor position, the characteristic values of the image capturing unit 101, and the depth of field (F number). Then, the filer action unit 1607 generates blurred image data by causing a filter to act on an image captured by the m-th compact camera that is set. The generated blurred image data is stored in the blurred image buffer 205. Such a series of processing is repeated until m reaches (M,M).

Then, the image composite unit 206 weights the blurred image data of each viewpoint and thus composite image data is generated and the generated composite image data is output to the display unit 105 via a composite image data output terminal (not shown schematically) (step 606, step 607).

As described above, in the present embodiment, each viewpoint image is blurred in accordance with the desired depth of field, the distance of the subject from the focus position, and the characteristic values of the image capturing unit 101 and the obtained blurred image is weighted and added, and thus, composite image data is obtained.

In the present embodiment, multi-viewpoint image data is obtained at one time by capturing images by the image capturing device having the camera array image capturing unit using a camera array. However, as explained in the first embodiment, it may also be possible to obtain multi-viewpoint image data by using only one image capturing device having a single-lens image capturing unit and by capturing images a plurality of times while deviating the viewpoint. Further, it may also be possible to acquire image data by using the Plenoptic camera as explained in the second embodiment.

(Processing in the Filtering Unit 204)

Next, processing in the filtering unit 204 according to the present embodiment is explained in detail.

Figure 18:
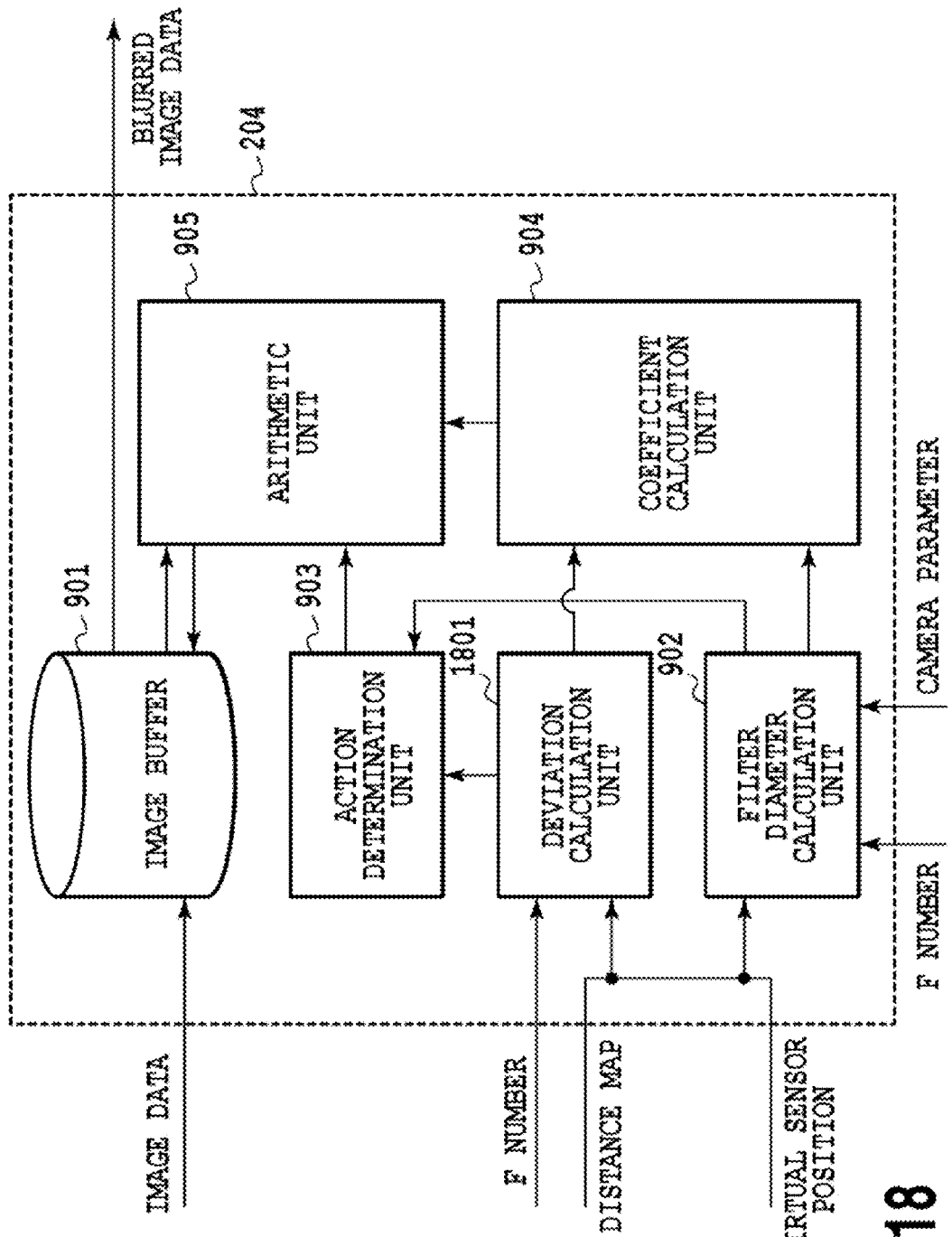
FIG. 18 is a block diagram showing an internal configuration of a filtering unit.

FIG. 18 is a block diagram showing an internal configuration of the filtering unit 204 according to the present embodiment. Here, only differences from FIG. 9 with which the internal configuration of the filtering unit 204 according to the first embodiment is explained are explained.

(About the Filter Diameter Calculation Unit 902)

The filter diameter calculation unit 902 according to the present embodiment calculates the number of taps (cells) of the filter of the target pixel and the number of taps of the peripheral pixel thereof, respectively, by using the depth of field (F number) desired to be output, the distance map, and the virtual sensor position information. As explained in the first embodiment, when the interval of compact cameras is taken to be D, the interval ΔD' (see FIG. 10) of the point images 1007 to 1009 on the image capturing element 1004 is expressed by Expression (2).

[Formula 8]

$$\Delta D' = \frac{\sigma_{real}}{\sigma_{virtual}} \Delta D \equiv |\alpha - \alpha_{obj}| D \qquad \text{Expression (2)}$$

The size of the blur of a composite image is in proportion to the interval D of compact cameras, and therefore, it is possible to regard adjusting the depth of field as virtually adjusting D. Here, it is assumed that the depth of field is a value when calculated on the full size sensor (36 mm×24 mm) basis. If the focal length on the full size basis of the output image is taken to be f, it is possible to express the depth of field (F number) of the output image when simply combined by Expression (8).

[Formula 9]

$$F = \frac{f}{2MD} \qquad \text{Expression (8)}$$

Here, M is a numerical value when the number of compact cameras existing on one side of the camera array is 2M+1. For example, when three compact cameras configure one side of the camera array, the value of M is 1.

Consequently, if the depth of field (F number) desired to be output is taken to be $F_{out}$, the corresponding virtual interval $D_{virtual}$ of the compact cameras is expressed as Expression (9) below.

[Formula 10]

$$D_{virtual} = \frac{f}{2MF_{out}} \quad \text{Expression (9)}$$

Then, the interval $\Delta D_{virtual}'$ of the point images on the image capturing element in this case is expressed as Expression (10) from Expression (9).

[Formula 11]

$$\Delta D'_{virutal} = |\alpha - \alpha_{obj}| D_{virtual} = |\alpha - \alpha_{obj}| \frac{f}{2MF_{out}} \quad \text{Expression (10)}$$

The filter diameter calculation unit 902 in the present embodiment calculates the number of taps σ of the filter by dividing the case as follows by taking appropriate constants to be A and ε. The method for dividing the case is the same as that in the first embodiment and as follows.

Case 1) When $|\alpha-\alpha_{obj}(x,y)|D_{virtual}$<ε, σ(x,y)=0 is set.
Case 2) When ε≤$|\alpha-\alpha_{obj}(x,y)|D_{virtual}$, σ(x,y)=A$|\alpha-\alpha_{obj}(x,y)|D_{virtual}$ is set.

Case 1) means that no filter is caused to act on the subject in the vicinity of the focus position and Case 2) means that a filter is caused to act on the subject out of the focus position.

However, when the subject on the focus plane is resolved sufficiently and the blur of the subject at the position other than the focus position is made smooth, the method for determining the number of taps of the filter is not limited to Cases 1) and 2).

In the manner described above, the filter diameter calculation unit 902 according to the present embodiment calculates the number of taps of the filter by referring to the depth of field desired to be output, the distance to the subject, and the position of the virtual sensor.

(About Deviation Calculation Unit 1801)

The deviation calculation unit 1801 calculates an amount of deviation when the filter is caused to act with the filter center deviated. In the state where the focus position alignment unit 1601 has performed alignment, the subjects at positions other than the focus position have a parallax of the interval ΔD' between each image expressed by Expression (11) below.

[Formula 12]

$$\Delta D' = |\alpha - \alpha_{obj}|D \quad \text{Expression (11)}$$

Here, in order to output $F_{out}$ with the specified depth of field (F number), it is necessary to change the parallax between each image of the subjects at positions other than the focus position as Expression (12).

[Formula 13]

$$\Delta D_{virtual}' = |\alpha - \alpha_{obj}|D_{virtual} \quad \text{Expression (12)}$$

$F_{cam}$, which is the F number when all the images captured by all the compact cameras of the camera array are combined can be expressed by Expression (13).

[Formula 14]

$$F_{cam} = \frac{f}{2MD} \quad \text{Expression (13)}$$

Consequently, in the case of the (m, m')-th image capturing unit, the filter is caused to act on images with the filter center deviated by an amount expressed by Expression (14).

[Formula 15]

$$\delta \times (m, m') \equiv \frac{(\Delta D' - \Delta D'_{virtual})}{\Delta_{real}}(m, m') \quad \text{Expression (14)}$$

$$= \frac{f|\alpha - \alpha_{obj}|}{2M\Delta_{real}}\left(\frac{1}{F_{out}} - \frac{1}{F_{cam}}\right)(m, m')$$

Here, $\Delta_{real}$ is a pixel pitch and to obtain Expression (14), Expression (2), Expression (12), Expression (8), and Expression (13) are used. Causing the filter to act with the filter deviated corresponds to blurring by deviating a subject by an amount of Expression (14) and it is possible to set the parallax of the subject between each image to $\Delta D_{virtual}'$. Due to this, it is possible to adjust the F number of an output image to $F_{out}$.

In this manner, the deviation calculation unit 1801 calculates the value of Expression (14).

FIG. 19 is a diagram for explaining the way the filter is caused to act with the filter center deviated. FIG. 19A shows a filter without deviation. FIG. 19B shows the filter shown in FIG. 19A with the filter center deviated by (1, 1) pixel. The cell indicated by the thick number (0.06 in FIG. 19A and 0.048 in FIG. 19B) is the position of the target pixel. By causing the filter to act with the filter deviated as in FIG. 19B, it is possible to deviate the image of the subject by an amount corresponding to (1, 1) pixel in this case.

As a summary of the above, in the present embodiment, by causing the filter to act with the center thereof deviated, the position of the image of the subject on the image is deviated and the parallax amount is adjusted. By this, the effect of virtually changing the interval of the compact cameras from D to $D_{virtual}$ in FIG. 10 is obtained. Further, by setting the filter diameter also to a filter diameter corresponding to the interval of $D_{virtual}$ it is made possible to reproduce the blur when the interval of the compact cameras is $D_{virtual}$.

Figure 20B:
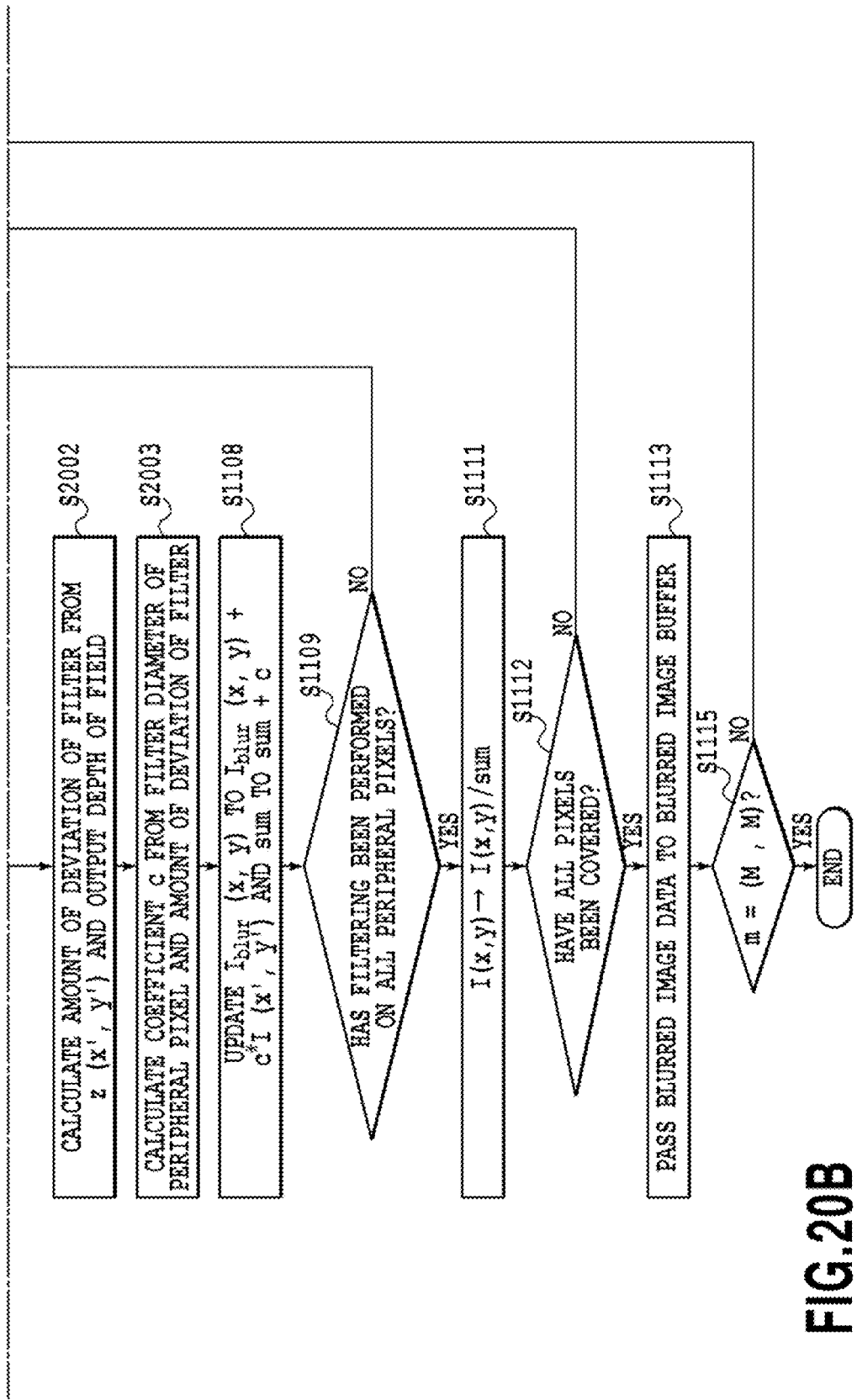

FIG. 20 is a flowchart showing a flow of the processing in the filtering unit 204 according to the present embodiment. Here, only the differences from the flowchart of FIG. 9 with which the flow of the processing in the filtering unit 204 according to the first embodiment is explained are explained.

In step 2001, the filter diameter calculation unit 902 calculates filter diameters of the target pixel and the peripheral pixel, that is, the number of taps σ (x,y) of the filter of the target pixel and the number of taps σ (x',y') of the filter of the peripheral pixel.

In step 2002 that follows, the deviation calculation unit 1801 calculates an amount of deviation (m, m')×δ(x', y') of the filter in the peripheral pixel based on Expression (14).

In step 2003, the coefficient calculation unit 904 calculates the coefficient c from the number of taps σ (x',y') of the peripheral pixel and the amount of deviation (m, m')×δ(x',y') of the filter. Here, it is assumed that the coefficient c is a Gaussian coefficient and calculation is performed using Expression below.

[Formula 16]

$$c = \frac{1}{2\pi\sigma(x', y')^2} \exp\left(-\frac{\begin{bmatrix}(x-(x'-m\delta(x', y')))^2 + \\ (y-(y'-m'\delta(x', y')))^2\end{bmatrix}}{2\sigma(x', y')^2}\right) \quad \text{Expression (15)}$$

The coefficient c is not limited to a Gaussian coefficient because the coefficient is required only to smooth the blur.

Figure 21A:
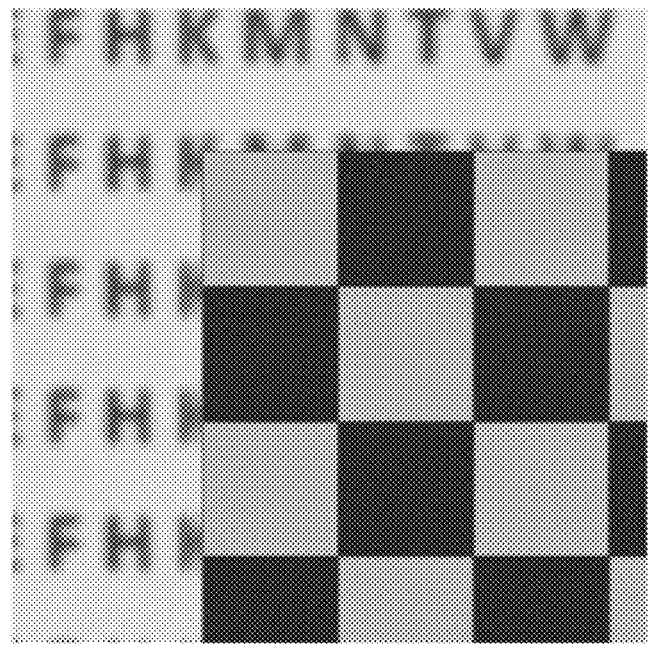
FIGS. 21A and 21B are photos when the image processing according to the third embodiment is applied.
Figure 21B:
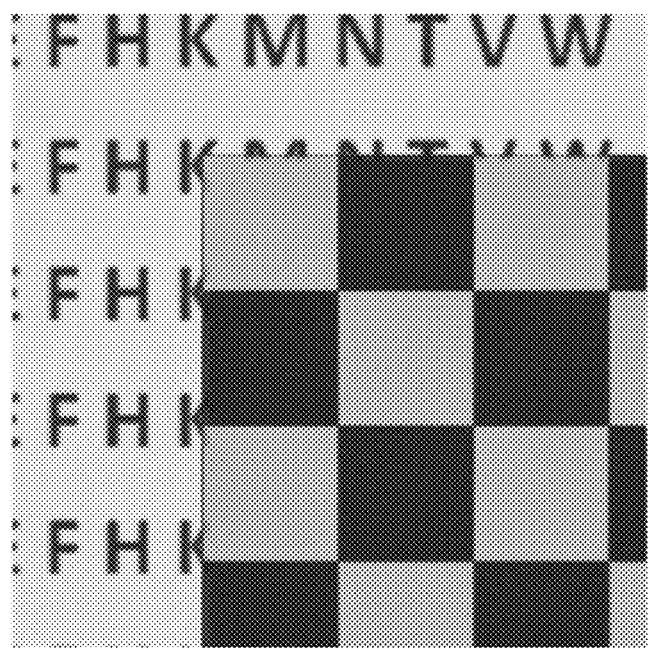

FIGS. 21A and 21B are diagrams (photos) for explaining the effect when the image processing according to the present embodiment is performed. The image of the same scene as that of FIG. 12 is captured and the checkered square is in focus. FIGS. 21A and 21B are both examples when the depth of field is adjusted after the acquisition of the image and it is known that the depth of field is shallow in FIG. 21A and the depth of field is great in FIG. 21B. It is possible to adjust the depth of field to any F number up to $F_{cam}$, which is the F number when the range in which the image capturing units are arranged is regarded as an entrance pupil.

As described above, in the case of the present embodiment, it is made possible to continuously adjust the depth of field after image capturing while smoothing a blur by adjusting the filter diameter in accordance with the depth of filed desired to be output and causing the filter to act with the filter deviated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-190863, filed Sep. 1, 2011, and 2012-138922, filed Jun. 20, 2012, which are hereby incorporated by reference herein in their entirety.

What is claimed is:

1. An image processing apparatus that generates composite image data by combining multi-viewpoint image data corresponding to a plurality of viewpoints, the device comprising:
    a first input unit configured to input a virtual focus distance of the composite image data;
    a second input unit configured to input distance information indicative of a distance of a subject in the composite image data from a viewpoint included in the plurality of viewpoints;
    a determination unit configured to input information indicative of a positional relationship of the plurality of viewpoints and determine, based on the virtual focus distance, the distance information and the positional relationship, a size of a blurring filter, to be applied to the multi-viewpoint image data, which blurs an image;
    a filter processing unit configured to perform filter processing on the multi-viewpoint image data using the blurring filter of the size determined by the determination unit; and
    a generation unit configured to generate composite image data by combining the multi-viewpoint image data on which the filter processing has been performed.

2. The image processing apparatus according to claim 1, wherein
    the distance information has a distance to a subject for each region, and
    the filter processing unit performs filter processing on the multi-viewpoint image data based on the distance information indicative of the distance to a subject for each region.

3. The image processing apparatus according to claim 2, wherein the region is a pixel.

4. The image processing apparatus according to claim 1, wherein the information indicative of the positional relationships of the plurality of viewpoints indicates an interval of the plurality of viewpoints.

5. The image processing apparatus according to claim 1, further comprising a distance information acquisition unit configured to acquire the distance information indicative of a distance to a subject.

6. The image processing apparatus according to claim 5, wherein the distance information acquisition unit acquires the distance information indicative of a distance to a subject by calculating an optical flow between images indicated by the multi-viewpoint image data.

7. The image processing apparatus according to claim 5, wherein the distance information acquisition unit acquires the distance information indicative of a distance to a subject using a distance measuring sensor.

8. The image processing apparatus according to claim 1, wherein the blurring filter is a low-pass filter.

9. The image processing apparatus according to claim 1, further comprising an specification unit configured to specify a region in focus within images captured from the plurality of viewpoints, wherein
    the filter processing unit causes the blurring filter to act on a region other than the region in focus, the blurring filter concentrating more power in a region of lower frequencies than in the region in focus.

10. An image processing method for generating composite image data by combining multi-viewpoint image data corresponding to a plurality of viewpoints, the method comprising the steps of:
    inputting a virtual focus distance of the composite image data;
    inputting distance information indicative of a distance of a subject in the composite image data from a viewpoint included in the plurality of viewpoints;
    inputting information indicative of a positional relationship of the plurality of viewpoints and determining, based on the virtual focus distance, the distance information and the positional relationship, a size of a blurring filter, to be applied to the multi-viewpoint image data, which blurs an image;
    performing filter processing on the multi-viewpoint image data using the blurring filter of the size determined by the determining step; and
    generating composite image data by combining the multi-viewpoint image data on which the filter processing has been performed.

11. A program stored in a non-transitory computer readable storage medium for causing a computer to perform the image processing method according to claim 10.

12. An image processing apparatus that generates composite image data by combining multi-viewpoint image data corresponding to a plurality of viewpoints, the apparatus comprising:
- a first input unit configured to input a virtual focus distance of the composite image data;
- a second input unit configured to input distance information indicative of a distance of a subject included in the composite image data from a viewpoint included in the plurality of viewpoints;
- a determination unit configured to determine a filter processing to blur images represented by the multi-viewpoint image data based on the virtual focus distance and the distance information;
- a filter processing unit configured to perform the filter processing determined by the determination unit on the images represented by the multi-viewpoint image data; and
- a generating unit configured to generate a composite image data by aligning the images represented by the multi-viewpoint image data after the filter processing and combining the images represented by the multi-viewpoint image data after the alignment,
- wherein a difference between the distance of the subject and the virtual focus distance increases when a difference in a pixel position of the subject between the images represented by the multi-viewpoint image data after the alignment increases.

13. The image processing apparatus according to claim 12, wherein a shift amount of each pixel of the images represented by the multi-viewpoint image data used for the alignment is constant for each image regardless of a position of the pixel in the image.

14. The image processing apparatus according to claim 12, wherein the distance information includes a plurality of distance maps each of which corresponds to one of the plurality of viewpoints and indicates a distance of a subject corresponding to each pixel, and the filter processing unit is configured to perform the filter processing on each of the images represented by the multi-viewpoint image data using a corresponding distance map.

15. An image processing method for generating composite image data by combining multi-viewpoint image data corresponding to a plurality of viewpoints, the method comprising the steps of:
- inputting a virtual focus distance of the composite image data;
- inputting distance information indicative of a distance of a subject included in the composite image data from a viewpoint included in the plurality of viewpoints;
- determining a filter processing to blur images represented by the multi-viewpoint image data based on the virtual focus distance and the distance information;
- performing the filter processing determined by the determining step on the images represented by the multi-viewpoint image data; and
- generating a composite image data by aligning the images represented by the multi-viewpoint image data after the filter processing and combining the images represented by the multi-viewpoint image data after the alignment,
- wherein a difference between the distance of the subject and the virtual focus distance increases when a difference in a pixel position of the subject between the images represented by the multi-viewpoint image data after the alignment increases.

16. A program stored in a non-transitory computer readable storage medium for causing a computer to perform the image processing method according to claim 15.

* * * * *